United States Patent [19]

Aiken, Jr.

[11] Patent Number: 4,750,106
[45] Date of Patent: Jun. 7, 1988

[54] DISK VOLUME DATA STORAGE AND RECOVERY METHOD

[75] Inventor: John A. Aiken, Jr., Round Rock, Tex.

[73] Assignee: International Business Machines Corporation, Armonk, N.Y.

[21] Appl. No.: 71,600

[22] Filed: Jul. 8, 1987

Related U.S. Application Data

[63] Continuation of Ser. No. 586,598, Mar. 6, 1984, abandoned.

[30] Foreign Application Priority Data

Mar. 11, 1983 [JP]   Japan ................... 58-39318

[51] Int. Cl.⁴ ..................... G06F 11/00; G11B 5/09
[52] U.S. Cl. ................................................ 364/200
[58] Field of Search ............... 364/200, 900 MS File, 364/300; 360/53, 47; 371/10

[56] References Cited

U.S. PATENT DOCUMENTS

| | | | |
|---|---|---|---|
| 3,327,294 | 6/1967 | Furman et al. | 364/900 |
| 3,331,058 | 7/1967 | Perkins, Jr. | 364/900 |
| 3,689,891 | 9/1972 | Kril | 364/900 |
| 3,761,883 | 9/1973 | Alvarez et al. | 364/200 |
| 3,761,903 | 9/1973 | Bird, Jr. et al. | 360/47 |
| 4,020,466 | 4/1977 | Cordi et al. | 364/200 |
| 4,051,460 | 9/1977 | Yamada et al. | 364/900 |
| 4,150,428 | 4/1979 | Inrig et al. | 364/200 |
| 4,152,695 | 5/1979 | Democrate et al. | 340/146.1 |
| 4,214,280 | 7/1980 | Halfhill et al. | 360/53 |
| 4,328,580 | 5/1982 | Stockham, Jr. et al. | 360/47 |
| 4,420,807 | 12/1983 | Nolta et al. | 364/200 |
| 4,434,487 | 2/1984 | Rubinson et al. | 371/10 |
| 4,558,446 | 12/1985 | Banba et al. | 360/53 |
| 4,611,314 | 9/1986 | Ogata et al. | 371/10 |

FOREIGN PATENT DOCUMENTS 194143  11/1983  Japan .

OTHER PUBLICATIONS

IBM TDB, vol. 25, No. 7B, Dec., 1982, pp. 3758 to 3759, "Handling Defective Tracks in a Cached Storage System" to Benhase et al.
IBM TDB, vol. 25, No. 4, Sep., 1982, pp. 2053 to 2056, "Synchronous Pair Block Recording" to Baird et al.
IBM TDB, vol. 25, No. 1, Jun. 1982, pp. 433–435.

Primary Examiner—Gary V. Harkcom
Assistant Examiner—C. H. Lynt
Attorney, Agent, or Firm—J. F. Villella, Jr.; Andrea P. Bryant

[57] ABSTRACT

In a word processing system, a text stream is stored on a direct access storage device (DASD) for recall and editing. The text stream is organized into a document that is stored on the DASD as a data set. The data set comprises an index portion and a portion containing text records. The index portion is divided into nodes, of which the primary node is called the root node. A method called shadowing is introduced to protect index nodes from the loss of significant data. Status indicators are defined and maintained so that access to a data set for normal system operation may be prevented where there is significant chance that the data set index has errors or is inconsistent to the extent that the normal high performance access method routines may not be able to use the index or may cause inadvertent loss of valid text data. Recovery mechanisms enable all of the data on the DASD which can be located by indexes to be restored after normal terminations during complex data set index updates or when intermediate nodes in large data sets are lost due to storage media input physical errors.

13 Claims, 20 Drawing Sheets

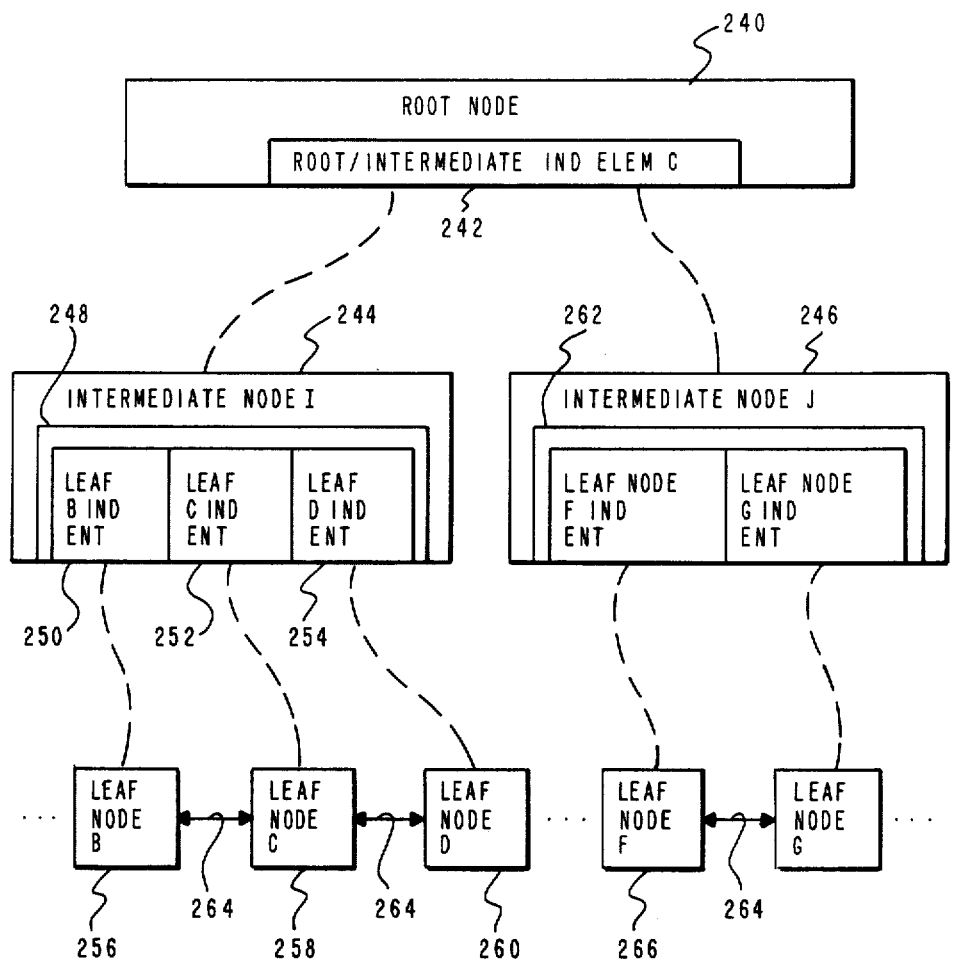
F I G. 6

STORAGE ACCESS METHOD
INTERNAL CONTROL BLOCK(UCS)

DISK VOLUME DATA STORAGE AND RECOVERY METHOD

This is a continuation of application Ser. No. 586,598 filed Mar. 6, 1984 now abandoned.

TECHNICAL FIELD

This invention relates to word processing systems and more particularly to the recovery of data stored on a Direct Access Storage Device (DASD) when the data may have been compromised through media errors or through system power failure during an update to the data set containing the data.

BACKGROUND ART

Some current word processing systems use a very simple format for storing and locating documents on its diskette. There are always exactly 32 data sets ("jobs") available on a diskette. Allocation is by diskette track. The entire diskette index used for locating the data sets on the diskette is small enough to be kept in a system memory at one time. The volume index is recorded redundantly on the diskette. The diskette index is copied to system memory when the diskette is inserted into the drive. Retrieving and searching the index thus does not pose a performance problem.

One of the main problems with this approach is the lack of flexibility with respect to the number of jobs or documents available on a single storage volume (diskette). In general, a word processing system needs to store a variable number of data sets on a diskette volume, and more than 32 data sets should be available for the system operator. This is especially true on word processing systems in which one of the storage volumes is a high-capacity internal hard disk.

Another problem with this approach is that space on the diskette is allocated to a particular data set on a track basis. Thus, the average wasted space on the diskette (allocated but not actually used to store data) is one-half track for each job that is actually in use, or a maximum of 16 tracks out of the 70 tracks available on a diskette.

Other current word processing systems employ a 2-level diskette index, consisting of the diskette index which shows the location of data sets on the diskette, and one data set index for each existing data set. The diskette index is fixed-sized; the size of the data set index depends on the size of the data set. To locate a page of a document requires searching the data set index from the beginning to the appropriate points in the data set index which show where the page is located on the diskette.

The problem with this approach is that it is very vulnerable to media errors in the diskette index or data set index areas on the diskette. If a media sector containing the diskette index cannot be read successfully, all data sets accessed via that diskette index block, and all data sets accessed by subsequent diskette index blocks, are lost and no longer accessible to the operator. With respect to the data set index, a similar problem exists: if a data set index sector cannot be read from the diskette, that data set index block and all subsequent ones are lost, which means that all records accessed from those lost sectors are likewise lost to the operator.

Another problem with both of these approaches is that error-free operation on certain physical sectors on the diskettes is essential for the use of the diskettes. This applies to cylinder 0 (the diskette track or tracks accessed with the read/record head in the home position), where certain information structured according to standard architectures is required to interpret the contents of the rest of the volume. In other words, if an error is detected on track 0 of a diskette, the diskette normally may not be used further.

Another approach in current use has the data set index distributed with the data in the working (non-permanent) storage. Each data block has some control area containing, among other information, the location of the prior and the next block. This means that sequential access is very fast, since the current record always defines the location of the next (and prior) record. The problem with this approach is that random access (going directly to records in the middle of the data set) is slow, since all prior records must be read. To fix the random-access performance would require another data set index set up for random access.

DISCLOSURE OF THE INVENTION

It is accordingly an object of the present invention to preserve data set indexes to reduce the amount of operator data which is likely to be lost due to a single media error, and to increase the amount of data which is recovered for operator use subsequent to a media error or an incomplete updating of a data set or volume index due to system power failure or other abnormal system termination. This and other objects are to be attained in a manner that does not limit the flexibility of the system and in a manner that is independent of the type of data stored.

The foregoing and other objects and advantages are achieved with the present invention. Briefly, a method and apparatus is disclosed for accessing information (fetching information from the DASD and storing information onto the DASD) in a manner that protects information on the volume which is deemed to be critical. A critical piece of information is a piece of predetermined information the loss of which would result in loss of substantial amounts of operator data which would require substantial time for the operator to recreate. This is achieved through two methods.

First, during normal system operation, when data set indexes or volume indexes must be updated, critical information sectors are written onto the storage volume in two copies.

The first copy is located at the spot indicated by the igher-level index. The second copy is located at a fixed, that is, constant offset from the primary copy. Thus, if the location of the primary copy of the volume is known, the secondary copy of the information can be located when the primary copy cannot be fetched successfully due to a media error.

Second, when a possible error in a data set or volume index has been detected, such as revision of a data set has not been terminated in the normal manner, all volume and data set indexes are scanned to recover as much information as possible. This scanning technique is much more thorough than the techniques used for normal storage access method operations when the data set index is assumed to be without defect, and it is intended to locate data that the normal, high-performance search routines would not be able to locate due to errors in the index structure.

BRIEF DESCRIPTION OF THE DRAWINGS

FIG. 6 is a block diagram of an example of a data set index which contains a root node, two intermediate nodes, and many leaf nodes.

BEST MODE FOR CARRYING OUT THE INVENTION

Figure 1:
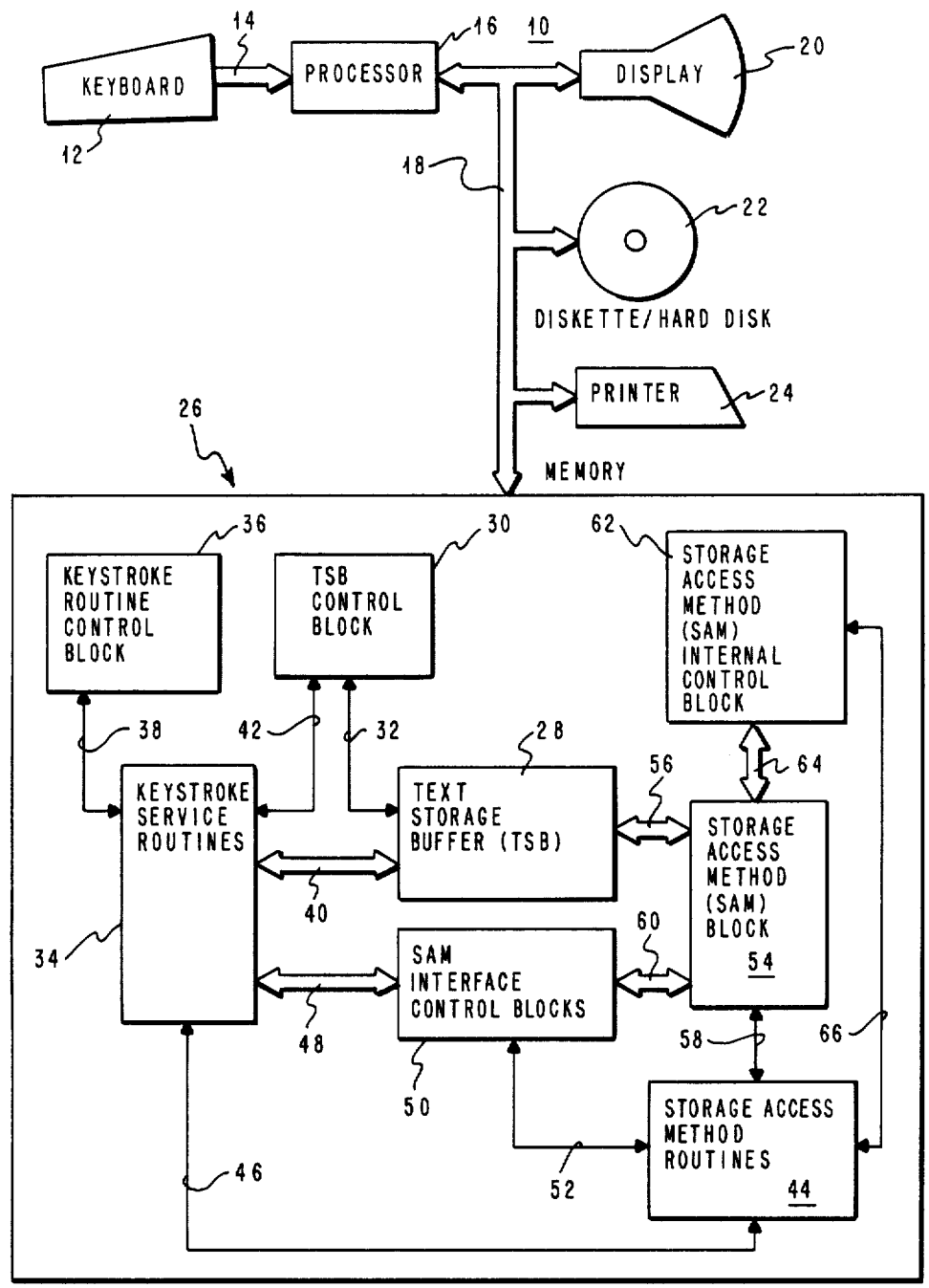
FIG. 1 is a block diagram of the word processing system embodying the present invention.

Referring now to FIG. 1, there is shown a word processing system 10 which includes a keyboard 12 for receiving text and operator commands and transmitting the input through a channel 14 to a processor 16. A memory bus 18 is connected to the processor 16 as well as to a CRT display 20, one or more Direct Access Storage Devices (DASD) 22, a printer 24, and a system memory 26.

An operator enters a text stream through the keyboard 12 and each page of text is stored and processed in the memory 26. As the text stream is received in memory 26, it is also presented in the display 20. After the text has been entered into the keyboard 12, it can be stored on the DASD 22 or printed out on the printer 24.

The memory 26 includes a number of data areas and functional programs for operating with the text stored in the system 10. The text and related control functions are stored in a text storage buffer (TSB) 28.

A TSB control block 30 serves as the data area for the TSB 28. Block 30 is connected through a channel 32 to the TSB 28.

As each character is input through the keyboard 12, it is received at the memory 26 through a collection of keystroke service routines 34. A keystroke control block 36 is a data area which determines the selected keystroke routine for processing the received character. Block 36 is linked to the keystroke service routines 34 through channel 38. The keystroke service routines block 34 is further linked through a channel 40 to the TSB 28 and through a channel 42 to the TSB control block 30.

When the TSB control block 30 indicates that text must be moved into or out of TSB 28 this movement request is communicated to the storage access method (SAM) routines 44 via channel 46. The SAM routines 44 serve to control all data movement between the DASD 22 and memory 26. (Corresponding access method routines for the keyboard 12, display 20, and printer 24 are substituted for block 44 when communication with these units is required.) The keystroke service routines 34 communicate further control information and data to the SAM routines 44 through channel 48 to the SAM interface control blocks 50. (Corresponding access method interface control blocks or the keyboard 12, display 20, and printer 24 are substituted for block 50 when communication with these units is required.) Upon completion of the SAM service request the SAM interface control blocks 50 will contain further information and data to be used by the keystroke service routines 34 for continued process. The SAM blocks 54 are connected to the SAM routines 44 by a channel 52.

A SAM block 54 is connected via channel 18 with the DASD 22. This block 54 serves as the transfer point for data transfers between the DASD 22 and memory 26. (Corresponding blocks for the keyboard 12, display 20, and printer 24 are substituted for block 54 when communication with these units is required.) The SAM block 54 is connected to the TSB 28 through channel 56. The SAM routines 44 can access data in the SAM block 54 through a channel 58. Block 54 is linked to the SAM interface control blocks 50 through a channel 60 for the purpose of communicating information and data to the keystroke service routines 34.

A SAM internal control block 62 is provided to contain the current status and information regarding the DASD 22. (Corresponding blocks for the keyboard 12, display 20, and printer 24 are substituted for block 62 when communication with these units is required.) Information is transferred between the DASD 22 and block 62 through the SAM block 54 by a channel 64. Information in the SAM internal control block 2 is communicated to and managed by the SAM routines 44 through a channel 66. Block 62 serves to store flags and status information as required by the operation of blocks 44 and 54.

The normal operation of the word processing system 10 is now briefly described with reference to FIG. 1. As the operator enters each keystroke at the keyboard 12 a corresponding signal is transmitted through channel 14 to the processor 16 which enters the keystroke command into the memory 26. Upon receipt of the keystroke command a keystroke routine is produced for block 34 to handle the particular command received. The keystroke command is processed according to whether it is a control command or a graphic entry, and the result of the keystroke processing is entered into the TSB 28. As graphics and commands are built up in TSB 28 the text information is presented at display 20. When the TSB 28 is in danger of being insufficient to hold the necessary text and commands, the keystroke service routines in block 50 will store control information in the SAM interface control blocks 50 to cause the SAM routines 44 to transfer blocks of information (in units called records) to the DASD 22.

Through control commands the operator can transfer information between the memory 26, display 20, DASD 22, and printer 24. Selected pages can be called up from the DASD 22 into the memory 26 so that the operator can make changes and corrections to the text and then re-enter the corrected text into the DASD 22 or have the corrected text printed at the printer 24.

Figure 2:
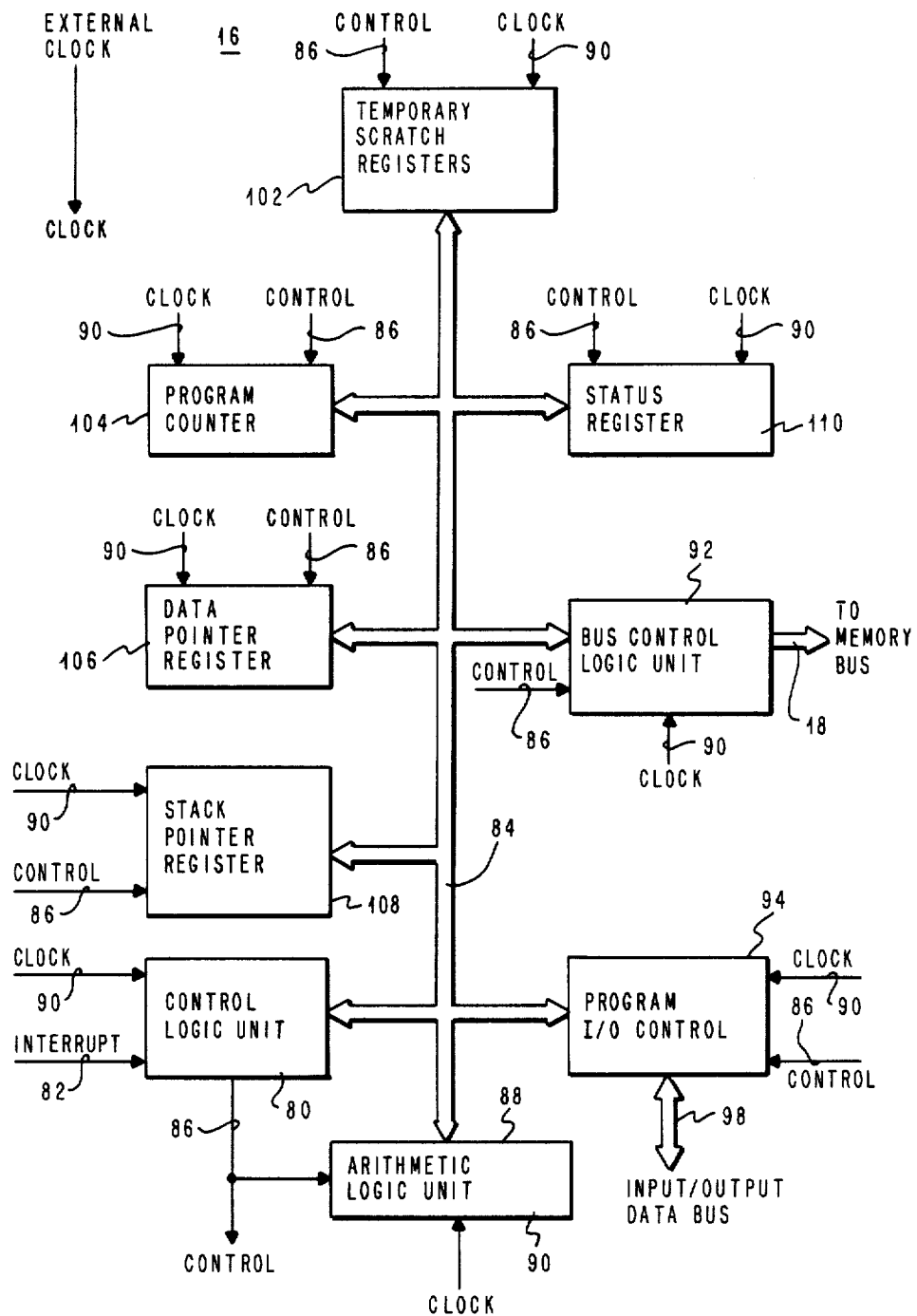
FIG. 2 is a block diagram further defining the processor shown in FIG. 1.

Referring to FIG. 2, the processor 16 is shown in further detail to illustrate typical hardware elements as found in such processors. The processor can be almost any commercially available unit.

Such a processor includes a control unit 80 which responds to interrupts on a device bus 82 from the keyboard 12, the DASD 22, or the printer 24. The control unit 80 is also connected to an internal bus 84 for data and address which is interconnected to various other units of the processor 16.

In response to a fetch instruction from the memory 26, the control unit 80 generates control signals to other units of the processor 16. These control signals are interconnected to the various units by means of a control line 86 which is illustrated directly connected to an arithmetic logic unit (ALU) 88 and identified as a "control" line 86 to other units of the processor. Synchronous operation of the control unit 80 with other units of the processor 16 is achieved by means of clock pulses input to the processor from an external clock source (not shown). The clock pulses are generated by the external clock and transmitted through a bus 90 also shown interconnected to most of the other units of the processor detailed in FIG. 2.

Data and instructions to be processed in the processor 16 are input through a bus control unit 92. Data to be processed may also come from a program I/O control unit 94. The bus control unit 92 interconnects storage elements of the memory 26 and receives instructions for processing data received from the I/O control unit 94 or received from the memory 26. Thus, the I/O control unit 94 receives data from the keyboard 12 or the DASD 22 or the memory 26, while the bus control unit 92 receives instructions and/or data from the same memory. Note, however, that different storage sections of the memory 26 are identifiable for instruction storage and data storage.

Device control information from the processor 16 is output through the program I/O control unit 94 over an I/O data bus 98. Input data on the data bus 98 from the keyboard 12 or other device is processed internally through the processor 16 by instructions through the bus 84 to the control unit 80 by the ALU 88. The ALU 88, in response to a control signal on line 86 and in accordance with instructions received on the memory bus 18, performs arithmetic computations which may be stored in scratch registers 102.

Various other transfers of data between the ALU 88 and other units of the processor are, of course possible. Such additional transfers may be to a program counter 104, a data pointer register 106, a stack pointer register 108, or a status register 110.

The particular operation of the processor 16 is determined by instructions and data on the memory bus 18 and input data on the bi-directional bus 98. As an example, in response to received instructions, the processor 16 transfers data stored in the scratch register 102 to any one of the registers 106, 108, 110. Such operations of processor 16 as detailed in FIG. 2 are considered to be well known by one of ordinary skill in the data processing field. A detailed description of each operation of the processor 16 of FIG. 2 for the described invention is not deemed necessary for an understanding of the invention as claimed.

Pages stored in the storage media on the DASD 22 are partitioned into records, which are units of text of convenient size. Records have a maximum size. Pages thus consist of at least one and possibly more records. The number of records in a page and the number of pages in a document are indefinite, and are constrained only by the capacity of the storage volume to store the data set. A data set in the word processing system 10 is stored on a single diskette or the hard disk. If a document being entered into the system 10 is too large for a single diskette, the operator must terminate the entry operation for the current diskette or hard disk and must continue the document in a different data set on another diskette.

The storage medium of the DASD 22 is partitioned into sectors in a manner well known in the data processing field. The concept of a sector is considered to be well known by one of ordinary skill in the data processing field. A detailed description of the concept of sectoring is not deemed necessary for an understanding of the invention as claimed. In the word processing system 10, each sector on the storage media is assigned a unique logical sector number, where logical sector numbers are consecutive nonnegative integers beginning with 0. The physical location on the storage media which corresponds to a particular logical sector number is not important to the understanding of the invention as claimed, as long as each logical sector number corresponds to one and only one physical area on the storage volume. Logical sectors are considered consecutive when their logical sector numbers are consecutive integers.

Figure 3:
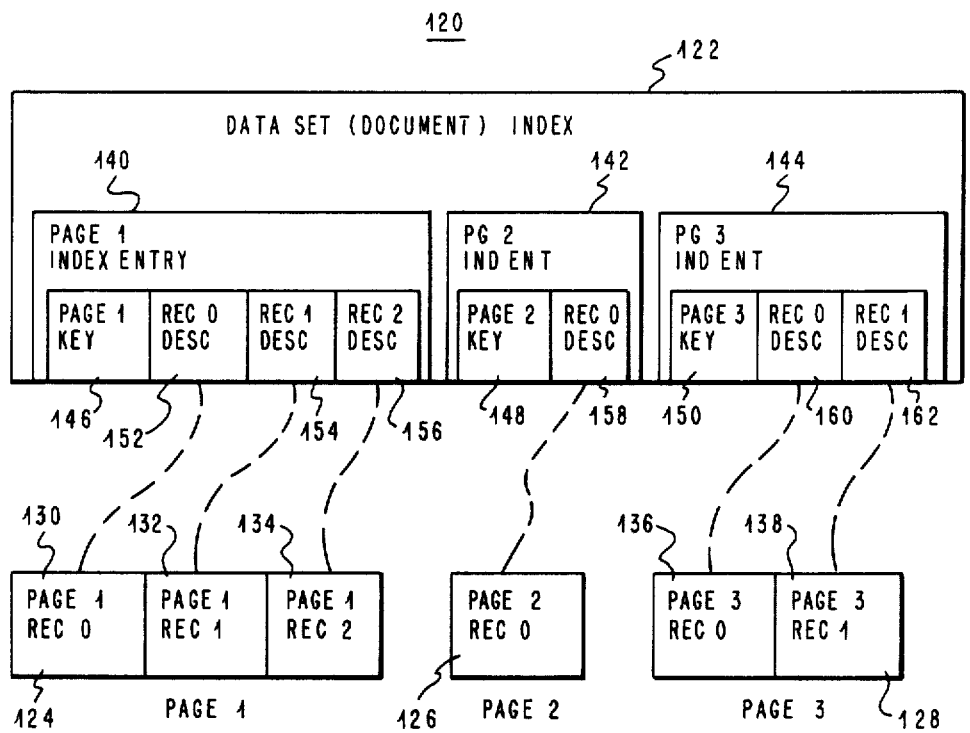
FIG. 3 shows the organization of text within a document on a Direct Access Storage Devices (DASD) such as a diskette or hard disk. Each document or other large grouping of information on the DASD is known as a data set.

Referring to FIG. 3, an example of a text document is shown as it is organized into a data set 120 on the DASD 22. The data set 120 in this example consists of a data set index 122 and three text pages, a page 1 (124), a page 2 (126), and a page 3 (128). Page 1 (124) has three records, a record 0 (130), a record 1 (132), and a record 2 (134). Page 2 (126) is small enough to be contained in a single record 0 (126). Page 3 (128) requires two records 136 and 138.

A data set index 122 is the means whereby the SAM routines 44 determine where on the storage media the data set pages are located. The data set index 122 contains one index entry for each page of the document, page 1 index entry 140, page 2 index entry 142, and page 3 index entry 144.

In order to facilitate locating the desired page quickly, each page index entry contains a key which identifies the page which is referenced by the entry. Thus, in this example, there exists a page 1 key 146, a page 2 key 148, and a page 3 key 150. To locate page 1 (126), for example, page 1 index entry 140 may be determined to be inappropriate simply by comparing the page 1 key 146 with the key of the desired page 2. In the word processing system 10, all page keys within a data set index must be unique.

The data for each record of a page is located through the index entry by means of a record descriptor. Each record is stored on the storage volume in a set of consecutive logical sectors. The number of logical sectors allocated to a record corresponds to the minimum number of sectors required to contain the record. Only whole sectors are allocated. The record descriptor contains the location on the storage media of the logical sector containing the record whose logical sector number is numerically lowest. The record descriptor also contains the length of the record. In FIG. 3, for example, the record descriptor for page 1 record 0 (130) is found in page 1 index entry 140 record 0 descriptor 152. The remainder of page 1 (124) is described in record 1 descriptor 154 and record 2 descriptor 156. The single record containing page 2 (126) can be located on the storage media by record 0 descriptor 158 in page 2 index entry 142. Page 3 index entry 144 similarly contains record 0 descriptor 160 and record 1 descriptor 162 pointing to page 3 record 0 (136) and page 3 record 1 (138), respectively.

The data set index 122 of a data set stored on the DASD 22 of system 10 is partitioned into index nodes. Each index node is stored in one logical sector. If additions of text to the data set cause the amount of information in one of the index nodes to grow beyond that which can be stored in one logical sector, the index node is partitioned into two or more index nodes, so that each resulting index node can be contained within one logical sector. Every data set has at least one index node.

Figure 4A:
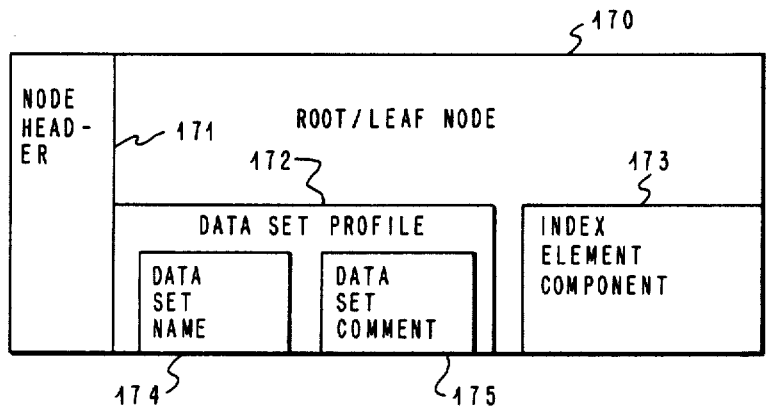
FIGS. 4A-C show an example of a data set index for a relatively small data set, where the data set index contains only a root/leaf index node.

For every data set there is a unique index node called the root node. Also, index nodes whose index entries refer directly to pages are called leaf nodes. FIG. 4A shows an example in which a data set index is small enough that the single leaf node needed and the root node are the same node, called the root/leaf node 170. Root/leaf node 170 contains a data set profile 172 and an index element component 174. The data set profile 172 contains information and status relating to the data set as a whole. A data set name 176 contains the text graphics by which the operator selects the document for access. A data set comment 178 provides more space for descriptive information about the document which the operator does not wish to have as part of the data set name 176.

Figure 4B:
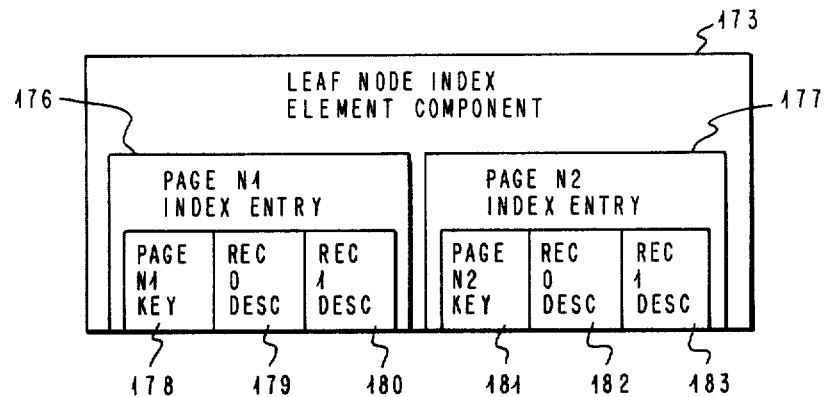

FIG. 4B is a diagram providing more detailed information about the index element component 174 of root/leaf node 170. A leaf node index element component 180 contains the index entries which point directly to pages of the document. Leaf node index element component 180 in this example contains among other index entries a page N1 index entry 182 and a page N2 index entry 184, where N1 and N2 represent the page numbers of a pair of consecutive pages in the document. Page N1 index entry 182 contains a page N1 key 186 and one record descriptor for each record in page N1 among which are a record 0 descriptor 188 and a record 1 descriptor 190. Similarly, page N2 index entry 177 contains a page N2 key 181 and a record 0 descriptor 183.

Within an index element component, index entries are stored in order of ascending page keys in such a way that if page N2 immediately follows page N1 in the document, page N2 index entry 177 will immediately follow page N1 index entry 176 if both page N1 and N2 are referenced within the same leaf node.

Figure 4C:
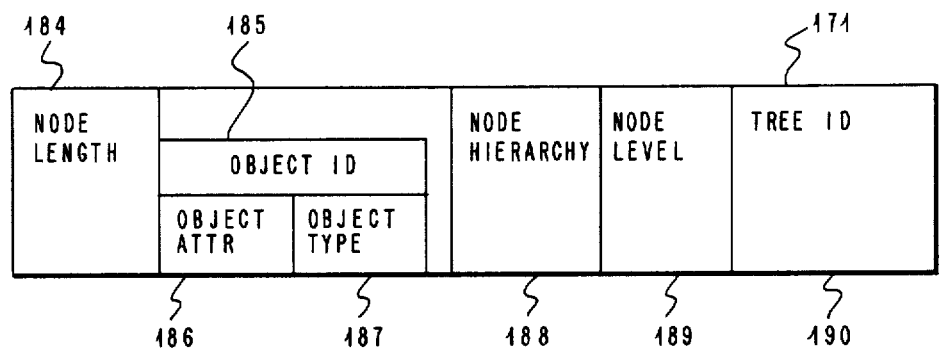

FIG. 4C provides more detail regarding the node header 171 shown in FIG. 4A. The node header 171 provides information regarding the index node as a part of a data set index. The format shown in FIG. 4C is common to all index nodes, though the contents of the various fields may differ from data set to data set and between index nodes within the same data set. A node length 184 contains the overall current length of usable data in the index node. The difference between the node length value and the DASD 22 sector size shows the amount of space remaining before the index node is full.

An object ID 185 shows the type of data set to which the index node belongs. The Object ID 185 is comprised of two portions: an object attribute 186 and an object type 187. The object type 187 shows the general type of data set. For example, all text documents have the same object type. The object attribute 186 shows whether the index node belongs to a low-level data set or an index of data set (called a director). A node hierarchy 188 indicates the type of index node. The various types of index nodes are: root node (primary data set node), leaf node (points directly to data set records), root/leaf node (combination of root and leaf), and intermediate node. FIG. 4A would indicate root/leaf for the small data set assumed for that example.

A node level 188 indicates the level the node occupies in the data set. A leaf node always has a node level value of 0. This applies also to the root/leaf node, since that node is simultaneously a root node and a leaf node. If the data set is large enough that multiple index nodes are required, the node level for any node in the index indicates the distance from the leaf level. The node level of the root thus always indicates the maximum number of levels in the data set, since the SAM routines 44 always ensure that there are an equal number of levels from the root node to any leaf node.

A tree ID 190 is the final portion of the node header. The tree ID 190 contains a data set ID which is unique to that data set on that storage volume. All index nodes within the same data set have the same tree ID, and index nodes belonging to a different data set will have a different tree ID. Tree IDs are assigned at the time the data set is created and are not reassigned as long as the same data set exists on the same DASD 22.

Figure 5A:
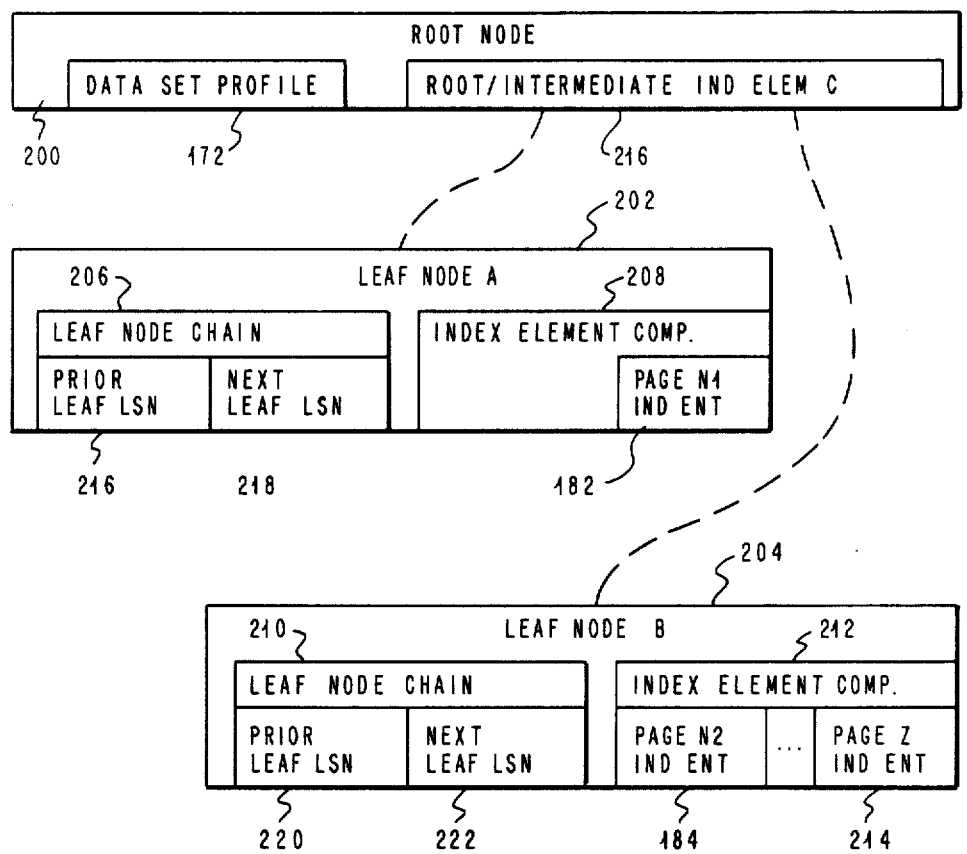
FIGS. 5A-B show an example of a data set index for a somewhat larger data set, where the data set contains a root node and two leaf nodes.

As the operator causes more text records and pages to be added to the document, root/leaf node 170 will eventually have insufficient room in index element component 174 for the next entry. FIG. 5A illustrates the result of partitioning root/leaf node 170 into a root node 200, a leaf node A (202), and a leaf node B (204). Root node 200 now contains a data set profile 172 the same as in root/leaf node 170 and a root/intermediate index element component 206. Leaf node A (202) has as major components a leaf node chain 206 and an index element component 208. Leaf node B (204) has as similar major components a leaf node chain 210 and an index element component 212.

The index element components 208 and 212 of leaf node A (202) and leaf node B (204) together contain the same information as was in the index element component 174 (as detailed in leaf node index element component 180 in FIG. 4B) of root/leaf node 170 in FIG. 4A. In the example of FIG. 5A, it is assumed that the index element component 180 has been split among index element components 208 and 212 such that the index entries for page N1 and all prior pages are stored in index element component 208 of leaf node A (202), and the index entries for page N2 through page Z (the last page of the document) are stored in index element component 212 of leaf node B (204). This implies that the page N1 index entry 182 is the last index entry in index element component 208, and page N2 index entry 184 is the first index entry of index element component 212. Since page Z denotes the last page of the document in this example, the page Z index entry 214 is the last index entry of index element component 212.

Figure 5B:
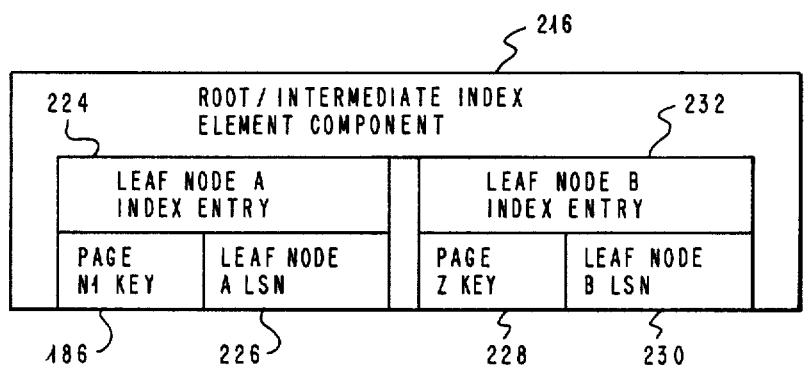

Note that the index structure illustrated in FIG. 5A-B allows quick selection of the proper leaf node for a particular desired page. While searching the index element component of the root node, comparing the key of the desired page with the keys of the index entries, the first index entry in the root node 200 containing a page key higher than the key of the desired page refers to the leaf node which must contain the index entry that locates the desired page if the desired page exists in the document.

To facilitate sequential viewing and revision of the document (commonly called scrolling through the document in the data processing field), leaf node chains are provided so that the next leaf node (or prior leaf node) may be located without reference to the root node of the document when the point of viewing or revision reaches records referenced at the end of the index element component for the appropriate leaf node. Leaf node chain 206 of leaf node A (202) contains two logical sector numbers (LSNs), a prior leaf LSN 216 and a next leaf LSN 218. In the example of FIG. 5A, there is no prior leaf for leaf node A (202), since leaf node A (202) contains the index entry for the first page of the document, so the prior leaf LSN 216 would be set to a value that may be recognized as an invalid logical sector number by the SAM routines 44. The next leaf LSN 220 in leaf node chain 210 of leaf node B (204) contains the logical sector number of leaf node A (202). Likewise, since leaf node B (204) contains the index entry for the last page of the document, the next leaf LSN 222 contains the invalid logical sector number value.

The root node 200 is the starting point of the index of the data set. Therefore, root/intermediate index element component 216 index entries allow leaf node A (202) and leaf node B (204) to be located on the storage volume. In leaf node A (202), page N1 index entry 182 references the last page referenced by leaf node A (202). This means that the page N1 key 186 (FIG. 4B) is the arithmetically greatest key in index element component 208. This is called the high key for the leaf node A (202). Similarly, the key in page Z index entry 214 is arithmetically greater than the keys for all other index entries in index element component 212 of leaf B(204), so the page Z key is the high key for leaf node B (204).

FIG. 5B is a diagram showing more detail for root-/intermediate index element component 216 of root node 200. Since there are two leaf nodes in FIG. 5A, there are two index entries in root/intermediate index element component 216. Leaf node A index entry 224 contains the page N1 key 186 and leaf node A LSN 226 contains the logical sector number of leaf node A (202). Likewise, a page Z key 228 and a leaf node B LSN 230, containing the logical sector number of leaf node B (204), are contained in a leaf node B index entry 232.

Note that unlike the record descriptors of FIG. 3, the leaf node index entries 224 and 232 do not contain values for record or index node lengths. Since index nodes are always a single logical sector, and since the root/intermediate index element component 216 always refers to index nodes (leaf nodes in FIG. 5A), the length of the referenced index nodes is always the same and can be omitted from the index entry.

Insertions of index entries for new pages or additions to existing index entries for new records always occur in a leaf node. As a consequence of this, it may happen that an existing leaf node contains insufficient space when adding a new record or page. The leaf node with insufficient space is then replaced with two leaf nodes in a SAM operation called a split. The root node index element component contained a single index entry for the leaf node prior to the split (leaf node B index entry 232, for example). This index entry must be replaced by two index entries, one index entry for each of the two new leaf nodes. This operation is a simple extension of the operation of splitting a root node into a root and two leaf nodes, and the operation will not be illustrated with a separate diagram.

As the operator enters the graphic characters and commands for a very large document, enough new leaf nodes may be added so that there is not enough space in the root node index element component 216 for another leaf node index entry. At this time the root node 200 must be split again. Because the root node 200 is referring to leaf nodes, new leaf nodes cannot be created (leaf nodes do not refer to other leaf nodes outside the leaf node chains). Instead, another type of node is created called an intermediate node.

Referring to FIG. 6, the root node 200 from FIG. 5A has been replaced with a root node 240 containing a root/intermediate index element component 242 which has the same structure as that shown by FIG. 5B. However, instead of containing leaf node logical sector numbers, the index entries in index element component 242 contain the logical sector numbers of intermediate node I (244) and intermediate node J (246). Within intermediate node I (244) there is an index element component 248 containing a leaf B index entry 250, a leaf C index entry 252, and a leaf D index entry 254 which refer to leaf node B (256), leaf node C (258), and leaf node D (260), respectively. The index entries in index element component 248 have exactly the same structure as leaf node A index entry 224 in FIG. 5B. The index element component 262 in intermediate node J (246) is structured in the same way as index element component 248.

The connections 264 between adjacent leaf nodes in FIG. 6 are a representation of the leaf node chain such as 206 and 210 in FIG. 5A.

FIG. 6 thus shows an example of a general index structure which allows the storage access method routines 44 to locate a desired page or record in two different ways, depending on the manner of viewing or revising the document. In order to locate the first record of a page referenced in leaf node D (260), the SAM routines 44 would fetch the root node 240 from the DASD 22 and would search the root index element component 242 to determine that intermediate node I (244) is the appropriate intermediate node. Intermediate node 244 would then be fetched from the storage media and the leaf node D (260) is similarly selected as the proper leaf node. After fetching leaf node D (260) from the storage media, the index element component of leaf node D (260) is searched to locate the key of the desired page.

On the other hand, if the operator is at the end of the last record referenced in leaf node C (258) and desires to scroll into the next record of text (which is referenced in leaf node D (260), the leaf node chain in leaf node C (258) can be used directly to locate leaf node D (260) on the storage media without requiring that the root node and an intermediate node be fetched and searched again.

Figure 7:
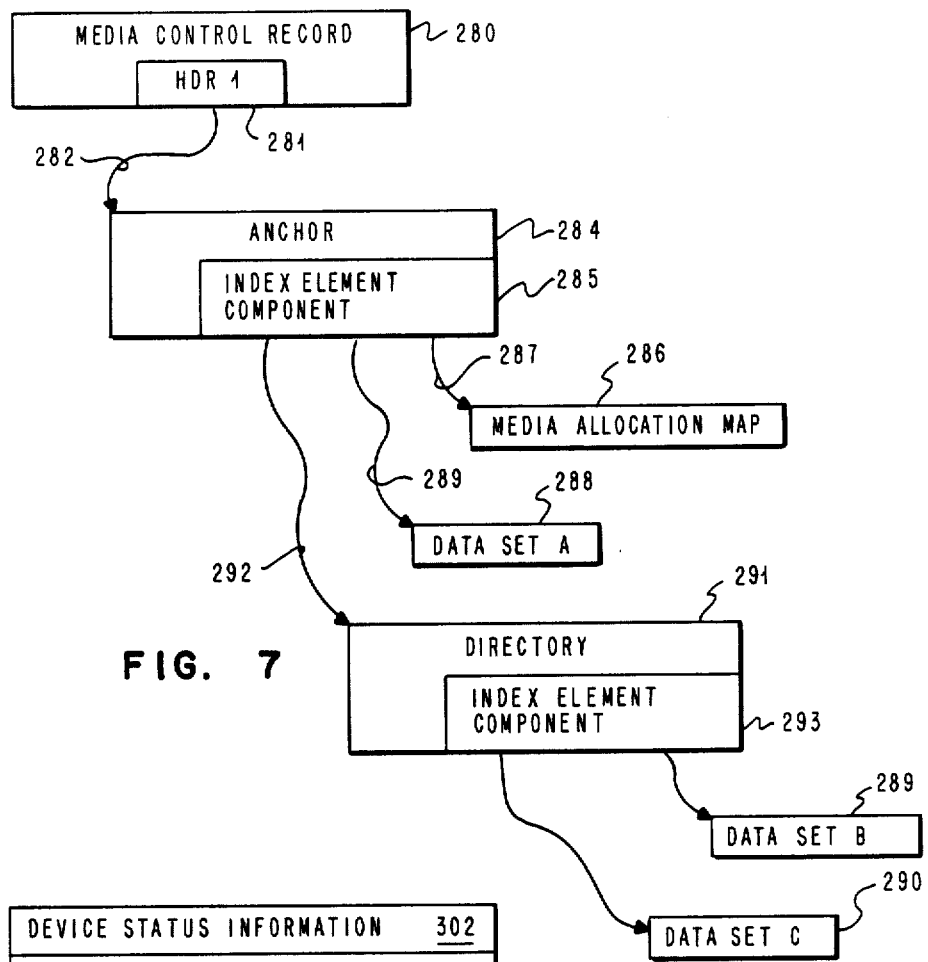
FIG. 7 is a block diagram of an example of the relationships between volume and data sets indexes. It is an extension and generalization of FIGS. 4-6.

The index structure shown as examples in FIGS. 4-6 can be generalized from a single data set to an entire volume, by constructing the volume as a hierarchy of indexes. FIG. 7 shows a block diagram of an example of a volume index. In this example, the storage volume contains three data sets. Two of the data sets have the same data set type (for example, both are text documents). The third data set has a different data set type.

For each storage volume, there is a media control record 280 which contains information about the volume as a whole, such as volume label (volume name). Within the media control record 280 there is a field called a HDR1 field 281. The purpose of the HDR1 field 281 is to provide information about the data residing on the volume. In particular, there is an anchor location pointer 282 (symbolized by a curved arrow from the media control record 280 to the anchor 284). The anchor location pointer 282 serves to show the location on the volume of an anchor 284.

The anchor 284 is the first level of volume index information. The function of the anchor 284 is similar to the volume table of contents on a DASD in a data processing system. In the word processing system 10, the anchor 284 is structured as a data set index. In particular, the format of the anchor is that of a root/leaf node, an example of which is shown in FIG. 4A. However, instead of referring to records and pages of a document as in FIG. 4A, the anchor 284 refers to volume information or other data sets. As with other index nodes, the anchor 284 contains an index element component 285 which refers to the lower-level data.

The format of the anchor index element component 285 is similar to the index element component 173 shown in FIG. 4B. In the anchor 284, the key of the index entry (similar to the page N1 key 178) is constructed from data set type.

Thus, there is one index entry in the anchor 284 for each unique data set type existing on the storage volume.

A media allocation map (mam) provides an indication of the allocation status of each sector on the storage media. In word processing system 10, the media allocation map contains one indicator for each sector on the media. The indicator shows whether or not the sector is available for allocation to a data set. The indicators for all existing index nodes and data set records indicate not available; in other words, these sectors have already been allocated. Media allocation techniques of this kind are considered to be well known in the art, and a detailed knowledge of the actual techniques used for managing the media allocation map contents in word processing system 10 is not deemed necessary for an understanding of the invention. The index entry for the media map 286 in the anchor index element component 285 has as the key the unique data set type assigned to the media allocation map, and has as the record descriptor (refer to FIG. 4B record descriptor 179) the logical sector number 287 and length of the media allocation map 286 on the volume.

In the example provided by FIG. 7, it is assumed that data set A (288) is the only data set of its type on the volume. Therefore, the index entry in the anchor index element component 285 consists of a key constructed from the data set type of data set A (288) and a logical sector number 289 showing the logical sector number of the root node of data set A (288).

Data set B (289) and data set C (290), however, are assumed to have the same data set type. Since the keys in an index element component must be unique, and since keys constructed from the data set types of data set B (289) and data set C (290) would be equivalent, another level of index is introduced to provide for this requirement. A director 291 is a data set index the data for which consists of lower-level data sets. The data set type of director 291 is the same as the data set type of all data sets to which it refers. Therefore, the index entry in anchor index element component 285 uses a key derived from the data set type of director 291 and refers to the directory root node via a logical sector number 292.

The director index element component 293 refers to data set root nodes. The keys for index entries in index element components 293 are the names of the data set (as contained in the data set profile 172 of the root node of each set, referring briefly to FIG. 4A). In word processings system 10, data sets on a single storage media are required to have unique data set names. Thus, the keys in directory index element component 293 are unique.

Like all other data set indexes, directory 291 may be expanded to multiple levels as the number of data sets is increased to the point that a single root/leaf is not sufficient to contain the index entries for all data sets of that data set type. Since the number of unique data set types in word processing system 10 is limited, however, it is never necessary to expand the anchor 284 larger than a root/leaf.

Figure 8:
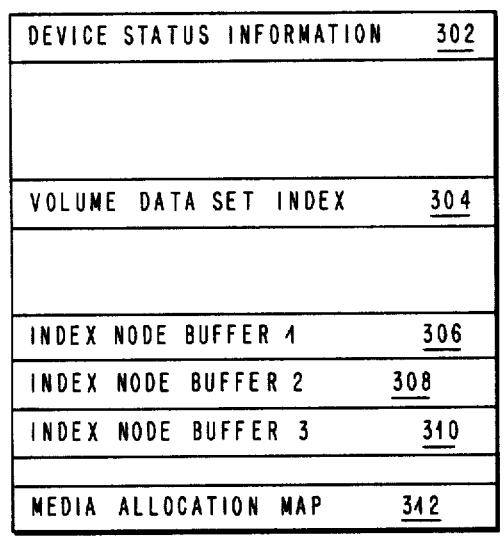
FIG. 8 is a diagram further defining the Storage Access Method (SAM) Internal Control Block shown in FIG. 1.

FIG. 8 provides more detail regarding a part of the SAM internal control block 62 shown in FIG. 1. A unit control block/storage (UCS) 300 contains device and operation status and control information and provides buffer areas for the access and updating of data set and volume indexes. The term volume refers to a DASD 22 such as a single diskette or a hard disk file attached to the word processing system 10. Each volume available for processing by the system has its own UCS.

A device status information area 302 contains data and control indicators used by the SAM routines 44 to control the actual I/O operations to the DASD 22. Device status information 302 is also used by the SAM routines 44 to determine which of the available volumes should be accessed during the processing of a request from the keystroke service routines 34.

A volume data set index buffer 304 contains the first level of volume index called an anchor. This buffer contains the anchor 284 in FIG. 7 for the volume in the DASD 22. The anchor is retained in the memory 26 in order to eliminate the input operation from DASD 22 when a data set must be located on the volume. Locating a data set on the volume is very similar to locating a page within a data set, where the keys in the volume index consist of the type of data set (text document, for example) and the data set name (as illustrated by data set name 1276 in FIG. 4A).

Index node buffer 1 (306), index node buffer 2 (308), and index node buffer 3 (310) are buffer areas in which data set index nodes or volume index nodes are processed between transfers to and from the DASD 22. Each index node buffer can contain one index node. More than one buffer is provided to facilitate index searches and split operations.

A media allocation map buffer 312 provides space for the media allocation map for the storage volume. This buffer will contain a copy of the media allocation map 286 (refer to FIG. 7) for the volume in the DASD device 22.

The rest of the USC 300 is used for internal status and control information and to contain the results of various intermediate calculations and operations, a detailed explanation of which is not deemed necessary for an understanding of the invention.

Figure 9:
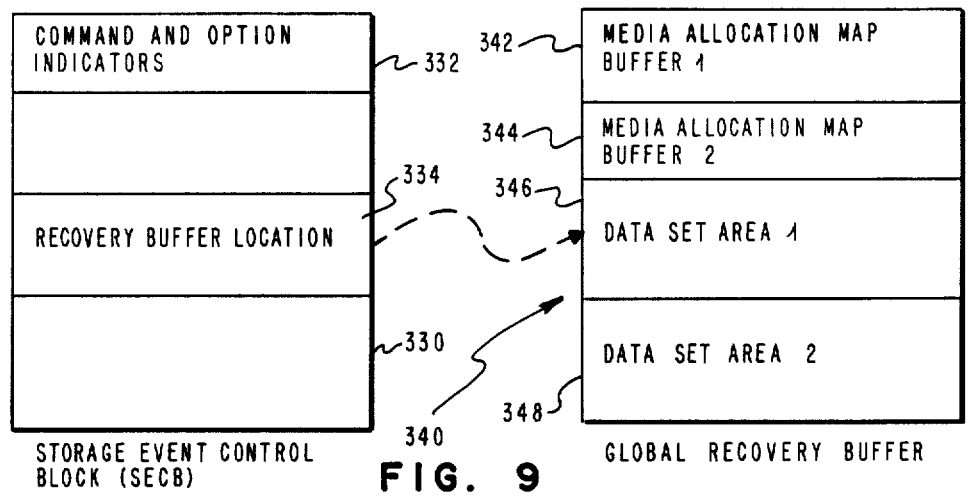
FIG. 9 is a diagram further defining the SAM Interface Control Blocks shown in FIG. 1.

FIG. 9 is a block diagram providing further details of the SAM interface control blocks 50 in FIG. 1. The major operations provided by the SAM routines 44 covered by the invention are Open data set for access, Read one or more records from the DASD 22 into the memory 26, and Write one or more records from the memory 26 to the DASD 22.

For each service requested of the SAM routines 44 by the keystroke service routines 34, a storage event control block 330 (SECB) is required. The area in the memory 26 that is actually allocated to the SECB 330 is determined by the keystroke service routine making their request. Channel 146 in FIG. 1 is used to pass the location of the SECB 330 to the SAM routines 44.

Within the SECB 330 can be found all the information necessary for the SAM routines 44 to initiate the particular operation requested. A command and option indicators area 332 provides the indication of major operation command requested (Recover volume, for example) and the command options which may modify the request. Command and option indicators 332 is used to produce a SAM service routine to process the particular command.

A recovery buffer location 334 contains the location in the memory 26 of a global recovery buffer 340. As with the SECB 330, the area in the memory 26 actually allocated to the global recovery buffer 340 is chosen by the keystroke service routines 34. The global recovery buffer 340 is used by the SAM routines 44 when it is necessary to verify or reconstruct the volume and data set indexes following an error situation.

In the protection and recovery of data sets and data records on a storage volume, there are two distinct phases: precautions taken to prevent loss of data due to media errors and the scanning of data set and volume indexes when a possible fault has been detected.

Media errors are detected when an attempt is made to fetch data and the data cannot be verified as valid by the system 10. Media errors in the system 20 comprise those errors common to the DASD 22, and may occur due to media surface contamination, media wear, and so on.

In the word processing system 10, the mechanism to protect against severe loss of data due to media errors is the recording of an extra copy of critical data on the volume. This is known as redundant recording. It is possible to record two copies of every piece of data to be stored on the storage volume. This has the disadvantage of reducing the effective capacity of the storage volume to half the actual capacity. Therefore, in the word processing system 10, a subset of the total information recorded is designated critical information which must be protected through redundant recording. Critical information is information the loss of which would require significant effort on the part of the operator to re-create or re-enter into the system.

Realizing that not all information can be designated critical without reducing the effective capacity of the volume, the first rule applied in word processing system 10 is that data records in a data set are not critical information. The loss of an individual data record would normally require only a little effort to recover by entering the data again via keyboard 12 in the normal entry manner. Therefore, only data set index nodes or volume index nodes may be considered critical. Referring to FIG. 7, if the media control record 280 cannot be fetched successfully, the anchor and all data sets cannot be located. Therefore, the media control record 280 is considered critical. In word processing system 10, the media control record is always recorded at logical sector number 0 and logical sector number 17. These logical sector numbers are independent of device type (diskette or hard disk 22). The contents of the two copies of the media control record are identical.

Similar to the media control record, the anchor 284 is considered critical because failure to read the anchor means that none of the data sets can be located. Therefore, two copies of the anchor 284 are stored on each storage volume. The contents of the two copies of the anchor are identical.

The location (logical sector number) of the primary and backup copies of the media control record must be known to the system 10 prior to the attempt to read the media control record. Since the media control record contains anchor location LSN 282, the anchor may be stored at any defect-free logical sector on the volume, and may be moved if an attempt to store an updated copy is not successful at the original logical sector; it is only necessary to alter the media control record to reflect the latest location of the anchor after such a location change.

In order to improve system performance, it is desirable to have both copies of redundantly-recorded information physically near each other on the volume, to minimize the time the read/record head of the DASD 22 is moving from one location to the other. On the other hand, it is desirable to have the two copies far enough from each other that a single defect o fault does not prevent access to both copies. Furthermore, the relative importance of each of the factors (performance, risk reduction) may be different for different storage volumes, depending on the contents of the volume.

Since the media control record is seldom accessed, this flexibility is not as important in word processing system 10. Therefore, the fixed location on all storage volumes was selected to reduce system logic complexity. In order to allow the location of the second copy of the anchor to be flexible, a second location area was added to the media control record to define the location of the backup copy of the anchor on the storage volume.

Figure 10A:
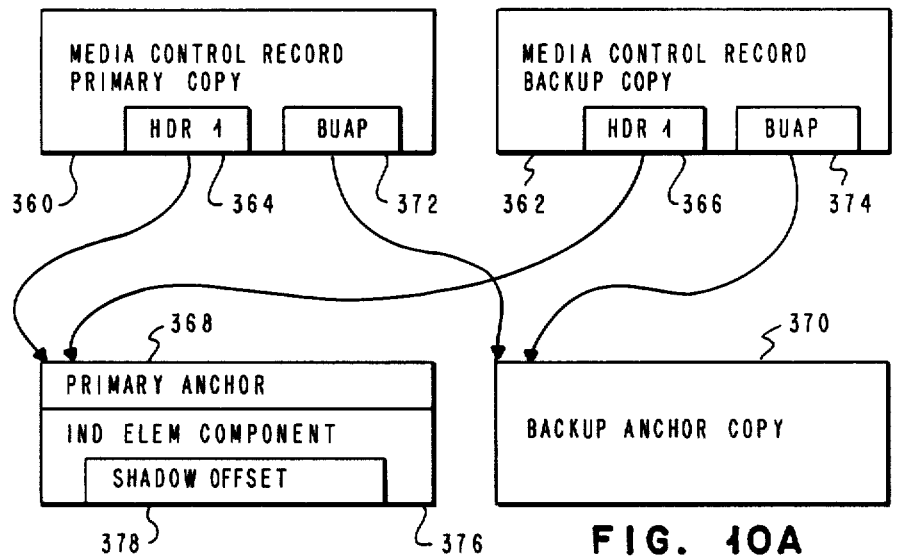
FIGS. 10A-B are block diagrams showing more details regarding the media control record and volume anchor when recorded redundantly. Details of the data set profile are also provided, indicating especially the leaf node shadow indicator and the data set status.

FIG. 10A shows a block diagram of the media control record and anchor from FIG. 7 with the backup copies. A media control record primary copy 360 is recorded at logical sector 0, with a backup copy 362 at logical sector 17. The primary copy HDR1 field 364 and the backup copy HDR1 field 366 both contain the media location of the primary anchor 368. An additional field called the backup anchor pointer (BUAP) has been added in each media control record copy, the primary copy BUAP 372 and the backup copy BUAP 374. Both contain the location of the backup copy of the anchor 370.

Referring to FIGS. 4–7, if the root node of a data set cannot be fetched successfully by the system 10, the data records in the data set cannot be located on the storage volume and the data is lost to the system operator. Therefore, all data set root nodes are considered critical and are recorded redundantly on the storage volume. This applies particularly to the root node of a directory, since the inability to access a directory root node implies that all data sets referenced by the directory (all data sets of that particular data set type) are lost to the system 10 and the system operator.

With respect to the directory 291 in FIG. 7, if there are enough data sets of the same type that the directory becomes multi-level (as in FIG. 5A or FIG. 6), the loss of a leaf node in the directory index would mean that several data set root nodes could no longer be located. Thus, directory leaf nodes are also considered critical index nodes in word processing system 10.

Referring to the previous description of FIGS. 4B and 5B, in particular the description of the record descriptor 179 and leaf node LSN 226, the location of the lower level (data record or index node) is provided by logical sector number. When the primary copy of one of the above critical nodes cannot be fetched without error, the backup (shadow) copy must be located. The performance of searching a data set index is related to the number of levels in the data set, and the number of levels is determined both by the number of data records in the data set and the size of the individual index entries. If an extra logical sector number were added to each of the index entries referring to critical sectors, this would mean that fewer records could be stored in a data set with a given number of levels. The index entries already contain the logical sector number of the primary copy. In word processing system 10, the backup (shadow) copy is defined to be located at a fixed logical sector number offset from the primary copy. In other words, the arithmetic difference between the LSN of the backup copy and the LSN of the primary copy is fixed for the storage volume.

Referring to FIG. 10A, in the anchor index element component 376 a shadow offset field 378 is defined. The shadow offset 378 is the difference in logical sectors between the logical sector number of the primary copy and the LSN of the secondary copy. Thus, if the volume anchor can be accessed, the logical sector number of a backup copy of a critical index node can be calculated by adding the shadow offset for the volume to the logical sector number of the primary copy. This allows the word processing system 10 to select the best shadow offset (based on performance and risk reduction factors) based on volume contents for different volumes. Since a copy of the anchor is available in the memory 26 in the volume data set index buffer 304 of USC 300, the SAM routines 44 can always locate the backup copy of critical information as needed.

From the above discussion, all root nodes are considered critical sectors (redundantly recorded). Also, directory leaf nodes are critical sectors. Other leaf nodes may be considered critical, depending on the type of data set. For example, the leaf nodes of a text document could be considered critical, since a leaf node may refer to many pages of text in a document. On the other hand, the leaf nodes of a program data set on a program diskette for word processing system 10 would not be considered critical, since the loss of any program data invalidates the program diskette and since another program diskette may be ordered from the manufacturer with little effort on the part of the system operator. Thus, some leaf nodes are considered critical and other are not, depending on the contents of the data set.

Figure 10B:
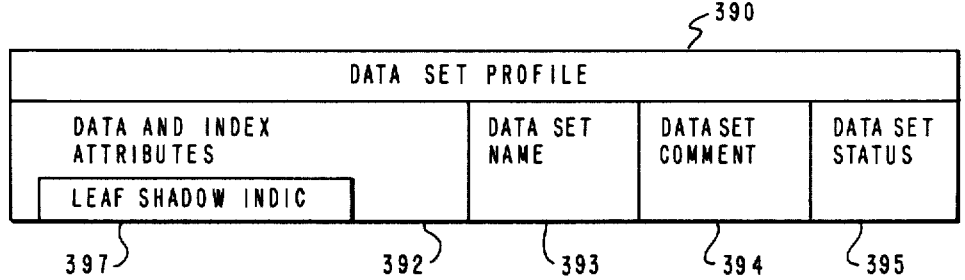

FIG. 10B provides more detail regarding the data set profile 172 of the root node 170 shown in FIG. 4B. Within the data set profile 390 there are four components: a data and index attribute component 392, data set name 393, a data set comment 394, and a data set status 395. The data and index attributes 392 contain the complete description for the SAM routines 44 of the structure of the data set index and the index entries within the index element component of the index nodes. In particular, a leaf shadow indicator 397 specifies whether or not the leaf nodes for this particular data set should be recorded redundantly. Thus, whether leaf nodes are critical or not may be specified for each particular data set. In word processing system 10, the keystroke service routines 34 generally treat any data set of a given type the same as all other data sets of the same data set type. Thus, all text documents would have their leaf node shadowed (recorded redundantly). With the SAM routines 44, all directory data set roots specify that leaf nodes should be shadowed.

Figure 11A:
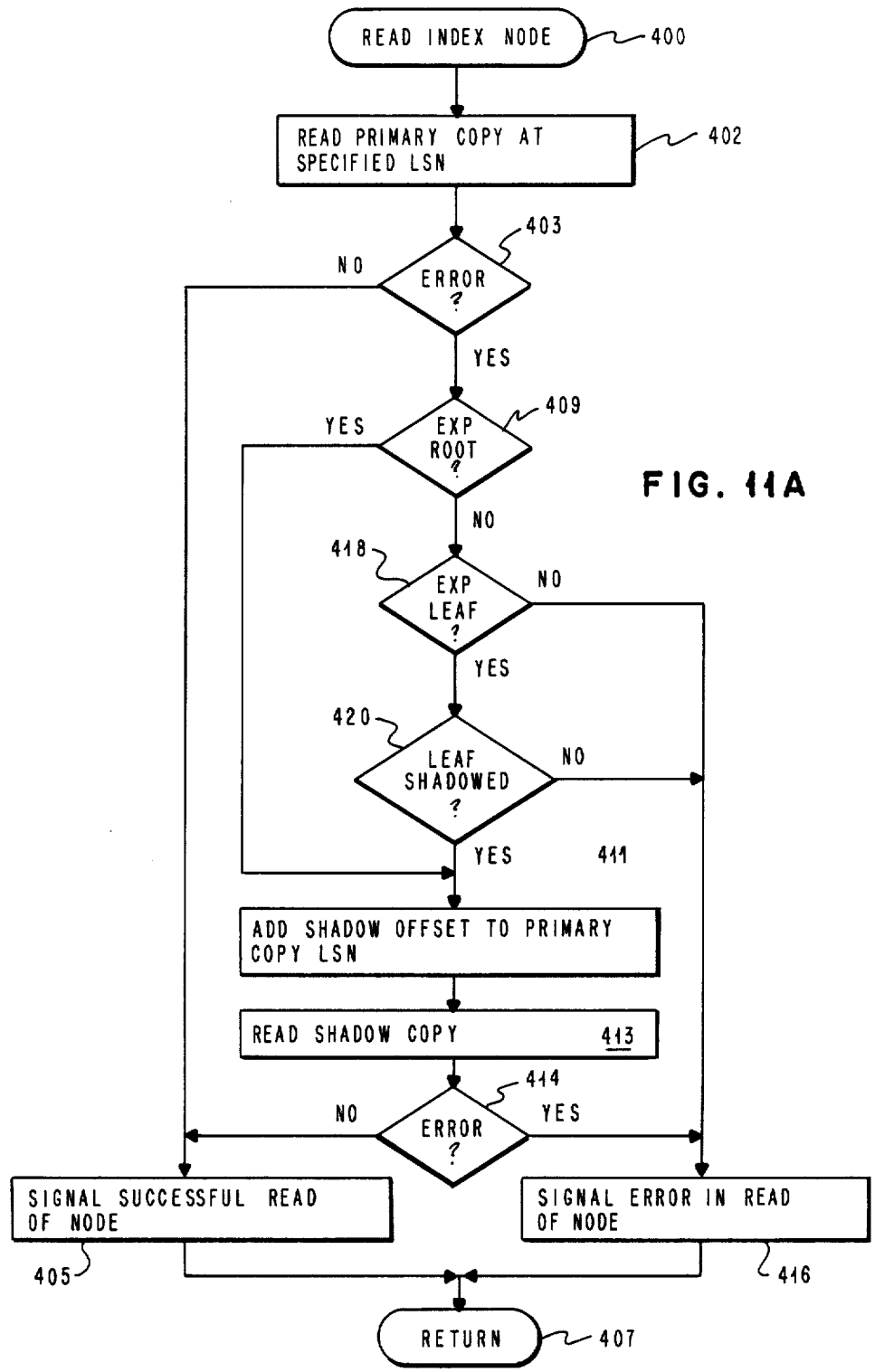
FIGS. 11A-B are flow diagrams showing the operational steps of the present invention with respect to Read and Write Index Nodes, showing how shadowed index nodes are managed.

A logical operation of the present invention with respect to Read index node is illustrated in the flow diagram shown in FIG. 11A. The procedure is started with the read index node service routine step 400. In step 402, the primary copy of the index node is read, using the logical sector number supplied by the procedure which caused the read index node procedure to be performed. If the check in step 403 determines that the index node was fetched successfully from the DASD 22, an indication of successful index node read completion is returned via a return code in step 405 and the procedure is terminated in step 407 until the next read index node is required. The return code means is a concept that is considered well known in the art, and understanding the exact mechanism is not deemed necessary to the understanding of the invention.

If an error was detected in step 403, the type of index node expected is examined in step 409. If a root node was expected, it was recorded redundantly initially, so the LSN of the shadow copy is calculated in step 411 by adding the volume shadow offset to the LSN of the primary copy, and the shadow copy is read in step 413. If no error in the fetch of the shadow copy is detected in step 414, an indication of successful read is returned in step 405 and the procedure is terminated in step 407 as before. If an error was detected in step 414, an indication of read error is signalled via return code in step 416 and the procedure terminates in step 407 as above.

If the expected index node is not a root node according to step 409, the expected node is checked in step 418 to see if a leaf node was expected. If not (intermediate node expected), an error indication is returned in step 416 as above since the primary copy could not be read successfully in step 402. The same is true if it is found in step 420 that the expected leaf node is not shadowed in the current data set (according to the leaf shadowed indicator 397 in the data set profile 390 of FIG. 10B). For expected leaf nodes which are shadowed, the procedure is the same as for a root node expected, with a read of the shadowed copy in steps 411 and 413.

Figure 11B:
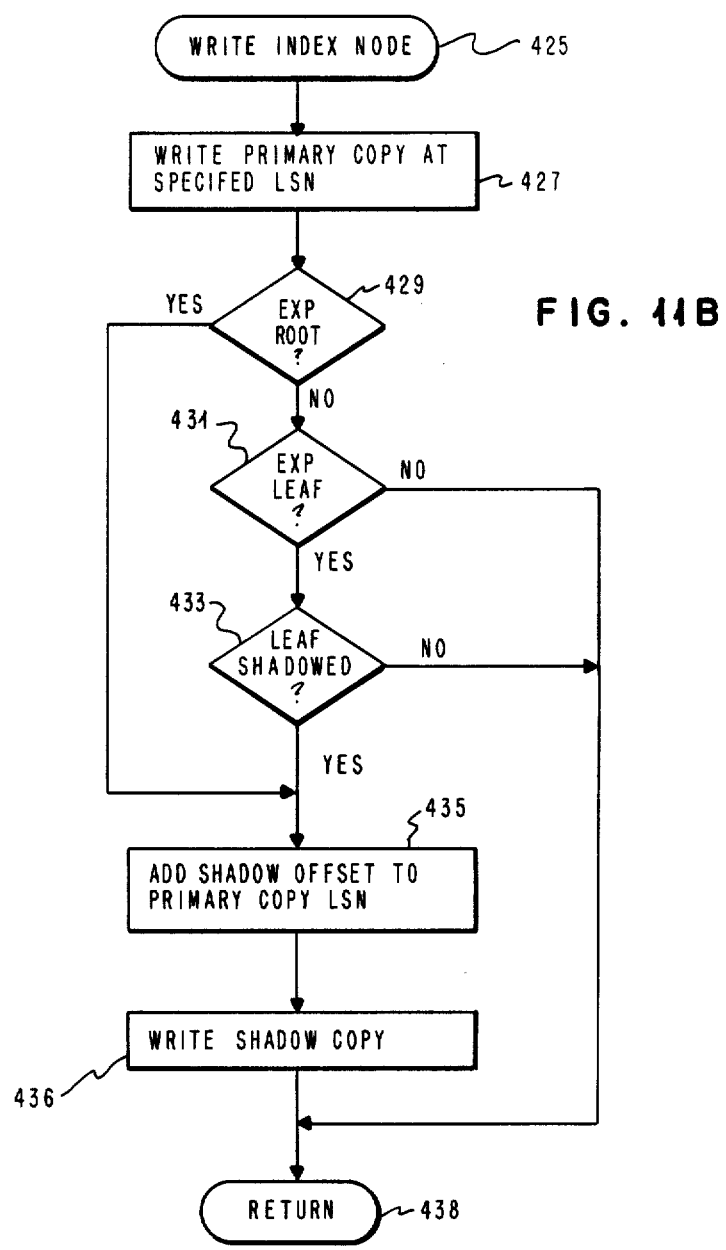

FIG. 11B shows a flow diagram illustrating a logical operation of the present invention with respect to Write index node. The procedure is started with the write index node service routine step 425. In step 427 the primary copy of the index node is written, using the logical sector number supplied by the procedure which caused the write index node procedure to be performed. If the check in step 429 determines that the index node is a root node, or if it is found in steps 431 and 433 that the index node is a leaf node and the data set profile shows that the leaf node should be shadowed, the LSN of the shadow copy is calculated in step 435 by adding the volume shadow offset to the LSN of the primary copy, and the shadow copy is written in step 436. The procedure is then terminated in step 438 until the next request for write index node is received.

It if is found in steps 429 and 431 that the index node is not a root and not a leaf node, or if the check in step 433 shows that the leaf nodes should not be shadowed in the current data set, the procedure is simply terminated in step 438 as above, since the primary and only copy was written in step 427.

The structures shown as examples in FIGS. 10A-B and the procedures illustrated in FIGS. 11A-B indicate how the word processing system 10 provides a flexible means of reducing the risk of significant loss of data for the system operator with minimum loss in storage capacity of the storage volume, while at the same time removing the absolute dependency on error-free operation on any one physical sector on the storage media.

During normal processing of word processing system 10, the SAM routines 44 assume that the data set index structures are complete and correct. If there are no storage media errors and no abnormal system terminations, this assumption is sufficient to assure proper access to any data set available on the DASD 22.

With the storage media used in the DASD 22, however, it is possible that data once successfully stored on the storage volume may not be accessed due to media errors. Referring to FIG. 6, if data records whose index elements lie in the index element component of leaf node C (258) are to be accessed, this normally requires scanning the root node; locating, fetching and scanning intermediate node I (244); and locating, fetching and scanning leaf node C (258) before the data records may be located and accessed on the storage volume.

The structures and procedures illustrated in FIGS. 10 and 11 greatly reduce the risk of being unable to access the root node or leaf nodes due to media error. However, the intermediate nodes are not protected via shadowing. Note that if any leaf node can be located, any other leaf node can also be located via the leaf node chains 264 in FIG. 6. If a read error was detected in the fetch of intermediate node I (244), it would still be possible to fetch intermediate node J (246), then fetch leaf node F (266), then successively located the prior leaf node via the prior LSN 216 of the leaf node chains 206 (refer briefly to FIG. 5A) until leaf node C (258) is located.

To add general procedures to accomplish such an alternative scanning to SAM routines 44 would greatly increase the complexity of the normal processing routines. It would also increase significantly the storage requirements in the memory 26. Since the total amount of the memory 26 is limited in word processing system 120, it is better to limit the size and complexity of the SAM routines 44.

A general overview of the media error approach adopted in word processing system 10 is as follows. Referring briefly to FIG. 10B, every data set root node contains a data set profile 390. One of the components of the profile 390 is a data set status component 395. In word processing system 10, the data set status may be in one of three different states: Closed, Open Update, and Damaged.

Figure 12A:
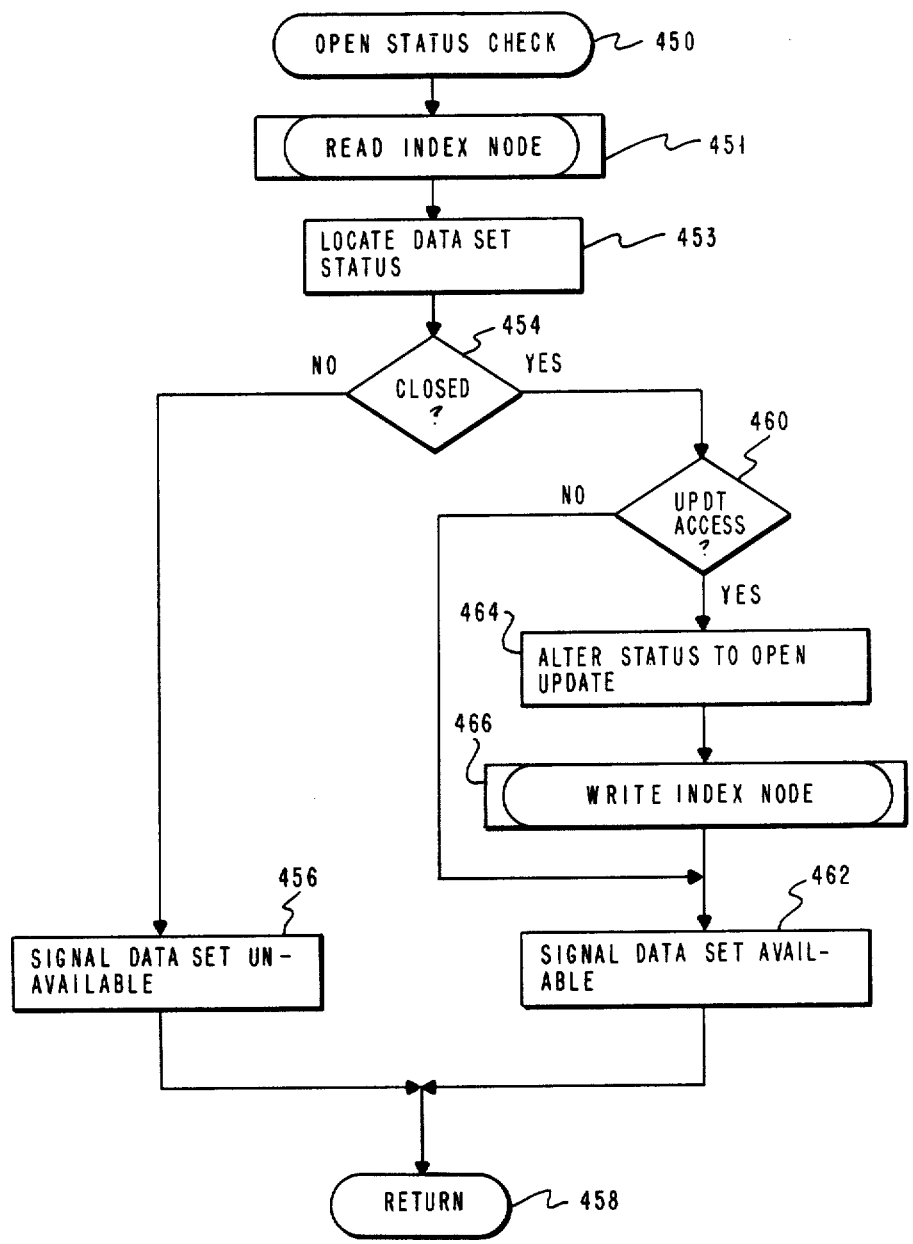
FIGS. 12A-B are flow diagrams showing the operational steps of the present invention with respect to Open and Close Data Set status checking and management.

Similar to most storage access methods for DASD in the data processing field, keystroke service routines 34 must present an Open request to the storage access method for a data set before issuing requests for access to data set records. FIG. 12A shows a flow diagram illustrating a logical operation of the present invention with respect to Open status check.

The procedure is started with the open status check service routine step 450. In step 451, the read index node procedure is performed to read the data set root, and the data set status in the data set profile is located in step 453. If the data set status indicated in step 454 that the data set is not closed, the data set is not guaranteed correct. Therefore, an indication of data set unavailable is signalled via return code in step 456 and the procedure is terminated in step 458 until the next open status check is required.

If it is found in step 454 that the data set current status allows access, the access request type is tested in step 460. If the request type is not for update (update means that the data set index and/or one or more records may be altered via addition, replacement, or deletion), an indication of data set available is returned in step 462 and the procedure is terminated in step 458 as before. If the request is for update access, the current data set status is altered in step 464 to open update and the write index node procedure is performed in step 466, prior to the available data set termination in steps 462 and 458 as above.

Thus, the SAM routines 44 for Open will allow access to a data set only when no prior unresolved problems or errors have been detected in the data set.

After successful Open of a data set, normal operation of the system 10 proceeds assuming that all data set indexes are correct and that all index nodes can be read without error (with procedures for recovering from read errors of critical sectors in normal processing as illustrated in FIGS. 11A-B). If a requested index node or data logical sector is found to be unavailable due to media error during normal SAM routines 44 processing, an error indication is returned to the keystroke service routine 34. When the keystroke service routine 34 issues a request for Close, this error detection indication must be saved on the storage volume to protect against later access until the problem situation is resolved.

Figure 12B:
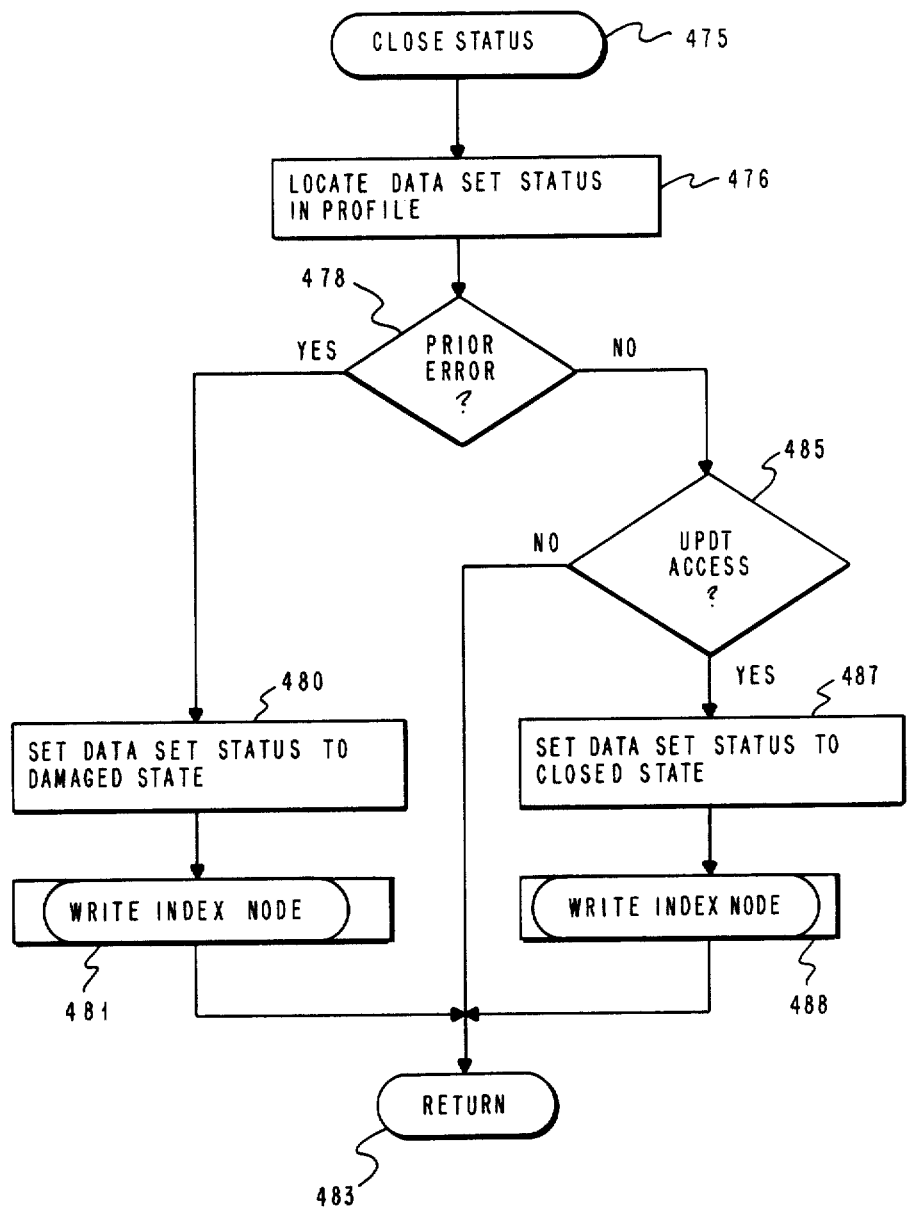

FIG. 12B shows a flow diagram illustrating a logical operation of the present invention with respect to Close status. The procedure is started with the close status service routine step 475. In step 476, the data set status component 395 of the data set profile 390 (refer to FIG. 10B) in the root node is located. If a prior data set error indication is found in step 478, the data set status is set in step 480 to the Damaged state and the write index node procedure is performed in step 481 to write the root node onto the volume. Thereafter, the procedure is terminated in step 483 until the next Close status is required.

If no prior error was detected in step 478, the current data set status is checked in step 485. If the current access type is not update, the procedure is terminated in step 483 as above. If the access type is update, the data set status is altered in step 487 to the Closed state, the write index node procedure is performed in step 488 to write the root node onto the storage volume, and the procedure is terminated in step 483 as above.

With the procedures illustrated in the above discussion of FIGS. 12A and 12B, the SAM routines 44 prevent access to a data set which is likely to have unresolved problems; detect problems that cannot be resolved by normal processing procedures (errors that cannot be resolved by accessing a duplicate copy recorded redundantly on the media); and, preserve an indication on the storage volume of unresolved problems detected in a data set.

In the normal operating environment of the word processing system 10, another situation may result in an incorrect data set index: an unanticipated power failure. If the external power supplied to the system 10 fails during the updating of an index, an incorrect data set or volume index structure may result.

Figure 13:
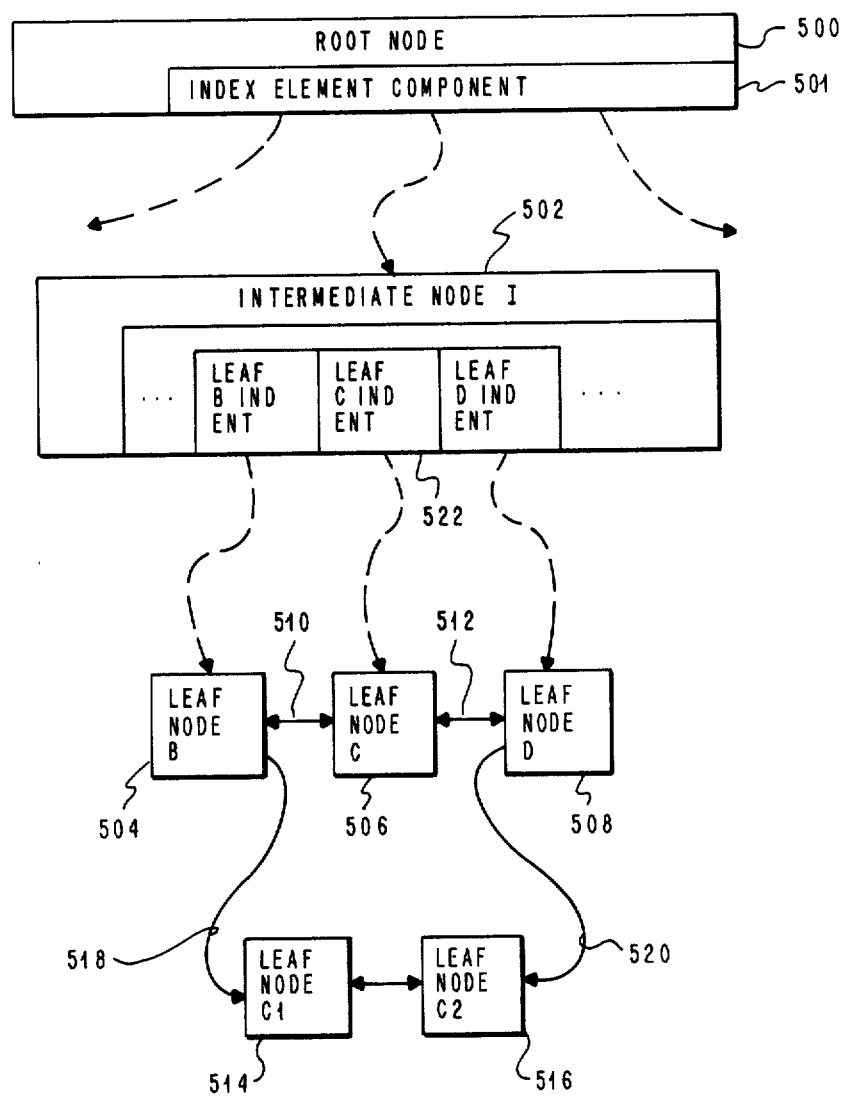
FIG. 13 is a block diagram of an example of a three-level data set index in which a split operation at the leaf level was interrupted by an external system power failure before the new leaf nodes could be reflected in the intermediate node.

FIG. 13 shows a block diagram of a example of a portion of a data set index similar to the one shown in FIG. 6. A root node 500 contains, among other items, an index entry referring to an intermediate node I (502). Intermediate node I (502) refers to leaf nodes B (504), C (506), and D (508). Leaf node chains 510 and 512 serves the same purpose as leaf node chains 264 in FIG. 6.

If records are added to the data set whose index entries should be stored in leaf node C (506), and sufficient records are added that leaf node C (506) does not have enough space for the index entries, two new leaf nodes must be created to replace leaf node C (506), namely leaf node C1 (514) and leaf node C2 (516). The leaf node chain joining leaf node B (504) and leaf node C (506) must be altered in leaf node B (504) to correspond with leaf chain 518. Similarly, leaf node D (508) must be altered so as to replace leaf chain 512 with leaf chain 520. Finally, leaf C index entry 522 in intermediate node I (502) must be replaced with two new index entries, one each for leaf node C1 (514) and leaf node C2 (516).

The process of writing the data records onto the storage volumes and reading and writing index nodes is not instantaneous. System external power may fail at any step in the index update process.

As an example, leaf nodes C1 (514) and C2 (516) have been stored on the volume. Leaf nodes B (504) and D (508) have had the leaf chains updated. However, before intermediate node I (502) can be altered and stored back on the volume, system external power fails.

When power is restored to the system 10, the data set index on the storage volume for the data set of root node 500 is incorrect. Leaf nodes B (504) and D (508) are chained to leaf nodes C1 (514) and C2 (516), respectively. However, intermediate node I contains an index entry for leaf node C (506), which should no longer be a part of the data set index. It does not contain index entries for leaf nodes C1 (514) and C2 (516), which should be part of the data set index. Thus, the data set contains an unresolved problem.

The detection of such an unresolved problem is already incorporated in the structures and methods discussed in connection with FIG. 12A. When the data set shown in FIG. 13 was selected for update access (required prior to inserting new records in the data set), the open status procedure illustrated in FIG. 12A caused the data set root 500 to be written to the storage volume with a data set status showing a state of Update. After power has been restored to the system 10, further access is prevented by the open status procedure due to the current data set status state of Update until the (potential) problems with the data set index have been resolved.

Another unresolved problem exists on the storage volume after the external power failure situation discussed with FIG. 13. FIG. 7 shows a volume media allocation map residing on the volume. For performance reasons, the copy of the media allocation map 312 in UCS 300 (FIG. 8) is not stored on the volume for every allocation change, but is stored at discrete intervals when index and data set record changes have been completed.

In the example of FIG. 13, the allocation indicators in the allocation map on the storage volume for the logical sectors containing leaf node C1 (514) and leaf node C2 (516) still indicate that the logical sectors are available for future allocation. If these sectors are later used to satisfy a request for allocation on the volume, different information may replace leaf node C1 (514), leaf node C2 (516), or both. In that case, all records whose index elements were in leaf nodes C1 (514) and C2 (516) would be lost for the operator.

A less critical problem exists in the case of the logical sector containing leaf node C (506), in that this sector still is shown as already allocated in the media allocation map on the storage volume. Since the information in leaf node C (506) is no longer needed, the logical sector containing leaf node C (506) should be available for future allocation.

The media allocation map problem discussed above pertains to the storage volume as a whole. In order to prevent loss of the new leaf nodes C1 (514) and C2 (516), update access must be prevented to the volume as a whole until the problem is resolved, since any request for new allocations of logical sectors on the volume will be done with respect to the single volume media allocation map.

Detection of the potential problem situation is performed by means of a volume update indicator in the volume anchor similar to the data set status in the data set root node. When a data set requested for Open of type update, the status in the anchor is set to reflect this fact. As long as any data set is open for update, the anchor status reflects the update status, even if the original data set is requested for Close. Only when the last data set open for update access is closed will the anchor status be updated to reflect that the volume index (including the media allocation map) contains no detected unresolved problems.

Resolving potential problems detected via the mechanisms discussed above is called recovery. Recovery must be able to resolve problems caused by media errors in data set or volume indexes and problems caused by abnormal termination of system processing due to external system power failure. On any given storage volume, it is possible for examples of all problems discussed so far to exist at the same time.

In order to construct a media allocation map for the volume that accurately reflects the current state of logical sector allocation, it is necessary to locate all sectors that are actually allocated to a data set or to the volume indexes. This actually means examining all index entries in every index node that can be reached directly or indirectly by starting with the system anchor. Referring to FIG. 7, this means locating all logical sectors allocated to one of the following: anchor 284, media allocation map 286, data set A (288), directory 291, data set B (289), or data set C (290). Referring to FIG. 13, this also means that only the valid index nodes and data records of a data set are to be considered allocated, and leaf node C should not be considered a valid index node. Referring briefly to FIG. 6, the existence of intermediate node J (246), leaf node F (266) and the leaf node chains 264 means that leaf node C (258) can be located indirectly even if intermediate node I (264) cannot be accessed successfully during recovery. As a part of recovery, the index entries lost when intermediate node I (244) was lost must be reconstructed in one or more similar existing or new intermediate nodes.

One aspect of recovery that is very important to the word processing system 10 is performance. It is vital to recover as much operator data as possible, using all sources of information made available by the structure of the volume indexes illustrated in FIGS. 4 through 7. On the other hand, the recovery procedures should complete as quickly as possible so that the system operator may continue with the more normal word processing tasks. In particular, the number of I/O operations directed at the DASD 22 should be minimized. Since it is necessary to access all volume and data set index nodes at least once to reconstruct the volume media allocation map, where at all possible an index node should be read and written no more than once.

The SAM routines 44 in system 10 comprise general access method procedures designed to process a wide variety of data set and data content types. Since unique keystroke service routines already exist for processing the data records of each data set type, the recovery procedures in the SAM routines 44 need not process the actual data records. A data record can be located on the volume, and the logical sector numbers allocated to that record can be determined, strictly through access to the data set index nodes (leaf nodes), without actually accessing the data records. Therefore, the recovery procedures in the SAM routines 44 will not access (read or write) data records. The keystroke service routines 34 must examine data records in damaged data sets after the SAM routines 44 have resolved all problems in volume and data set indexes on the volume. However, only data records in possibly damaged data sets must be examined. In other words, data sets whose data set status in the root node indicated a Closed state at the start (and end) of the SAM recovery procedures need not have the data records examined by the keystroke service routines 34. There will normally only be one or two damaged data sets on a volume where data records must be examined and data problems resolved. This greatly enhances the performance of the overall data recovery process for the system operator.

Figure 14:
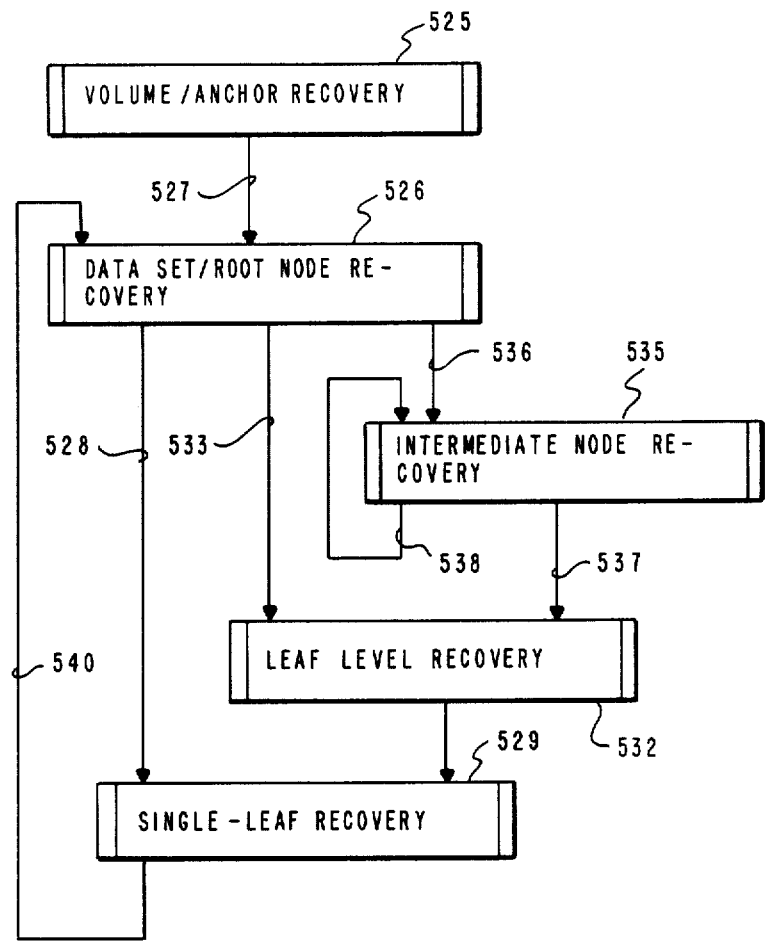
FIG. 14 is a block diagram showing the significant procedures in the volume recovery process, and the relationships between the individual procedures.

FIG. 14 is a block diagram illustrating the procedures comprising the recovery portion of the SAM routines 44 and the relationships between those procedures.

A volume/anchor recovery procedure 525 is performed in response to a request from the keystroke service routines 34 to the SAM routines 44 for a volume recovery. This procedure 525 initializes all recovery internal parameters in the global recovery buffer, controls recovery of the anchor, and distributes the results of the recovery to the UCS 300 (FIG. 8) or to the storage volume when other procedures have not already done so. In order to recover that anchor, each index entry in the index element component is processed one at a time. Because each index entry in the anchor refers to a data set (except the media map entry), which is processed in the volume/anchor recovery procedure), this process issues requests to a data set/root node recovery procedure 526, symbolized by the connection 527.

The data set/root node recovery procedure 526 controls the recovery of a single data set. The main functions of the procedure are to verify data set root validity, including data set name where possible; to check for invalid or unsupported values in the data set profile as an indication of a logical sector that is not really a root node or a data set that is not supported by the word processing system 10; to issue requests to other recovery procedures to perform recovery of the rest of the data set index; and, to perform updates to the root node as a result of recovery of lower-level index nodes in the data set index.

As indicated by the examples in FIGS. 4–6, a data set index may consist of a single level (root/leaf node); two levels (root node and leaf nodes); or, three or more levels (root node, one or more levels of intermediate nodes, leaf node level). The recovery procedures of these three cases differ somewhat.

For the root/leaf case, only the single node need be considered, and leaf chains are not relevant. In this instance, data set/root recovery will issue a request to a single-leaf recovery procedure 529, symbolized by connection 528, to process the index entries in the root/leaf node index element component.

When the data set has two or more levels, it is possible that the leaf nodes are not accurately referenced by index entries at the next-higher level. The order of node creation and updating during the process of splitting a leaf node into two leaf nodes is carefully managed so that the next leaf LSN values 218 in the leaf node chain 206 (FIG. 5A) are correct for all leaf nodes in the data set on the storage volume. Referring to FIG. 13, the next leaf LSN in leaf node B (504) is updated on the storage volume only after the leaf nodes C1 (514) and C2 (516) have been written to the volume.

A leaf level recovery procedure 532 controls the sequencing of recovering leaf nodes. It uses the prior leaf LSN and next leaf LSN of the leaf node chains to ensure that every leaf node in the data set index that can be located via chains is included in the recovery in the correct sequence. When a request is issued to leaf level recovery 532, as for example from data set/root recovery 526 as in connection 533, the specified leaf node is used as a starting point. Using the prior leaf LSN of the chains the procedure scans prior leaf nodes until either the left-most leaf node is found (for the first request to leaf level recovery for this data set) or a leaf node is allocated which has already been recovered. From that point leaf nodes are recovered and added to the higher-level index node until the leaf node of the original request is reached or passed.

When the data set has one or more levels of intermediate index nodes, the data set/root node recovery procedure 526 will issue a request for each of its index entries to an intermediate node recovery procedure 535 (connection 536). The function of the intermediate node recovery procedure 535 is to sequence through the index entries of the node issuing requests to the leaf level recovery procedure 532 as in connection 537. Since there are no chains in intermediate nodes, intermediate node recovery 535 considers only the requested intermediate node.

The word processing system 10 allows data sets with more than one level of intermediate node. In such a data set, the highest level of intermediate node contains index entries that refer to other intermediate nodes. When this happens, the intermediate node recovery procedures 535 issued a recursive request to itself, though the recursive request refers to a different intermediate node. The recursive request is symbolized in FIG. 14 by the connection 538.

Referring briefly to FIG. 7, the anchor index entries refer to data set root nodes and to root node of directories. The structure of a data set index and a directory index are equivalent. Therefore, the same set of recovery procedures are used for both indexes. When the index is a data set index, the single-leaf recovery procedure 529 must only ensure that logical sectors referenced in index entries are indicated as allocated in the media allocation map being re-constructed.

For directory indexes, however, each index entry refers to the root node of a data set of the same data set type. Verifying the validity of a directory leaf node index entry required recovering the data set to which the directory index entry refers. Therefore, the single-leaf recovery procedure 529 issues a recursive request to data set/root node recovery procedure 526 connection 540) for each data set and updates the direct leaf node based on the validity indication returned by the data set/root node recovery procedure 526. In word processing system 10, there is only one level of directory data set. An apparent directory root node which in turn is referenced in an index element in a directory leaf node is considered an invalid data set, and the index element in the directory leaf is deleted. Thus, the recursive request to the data set/root node recovery procedure 526 will not itself result in a further recursive request.

Figure 15:
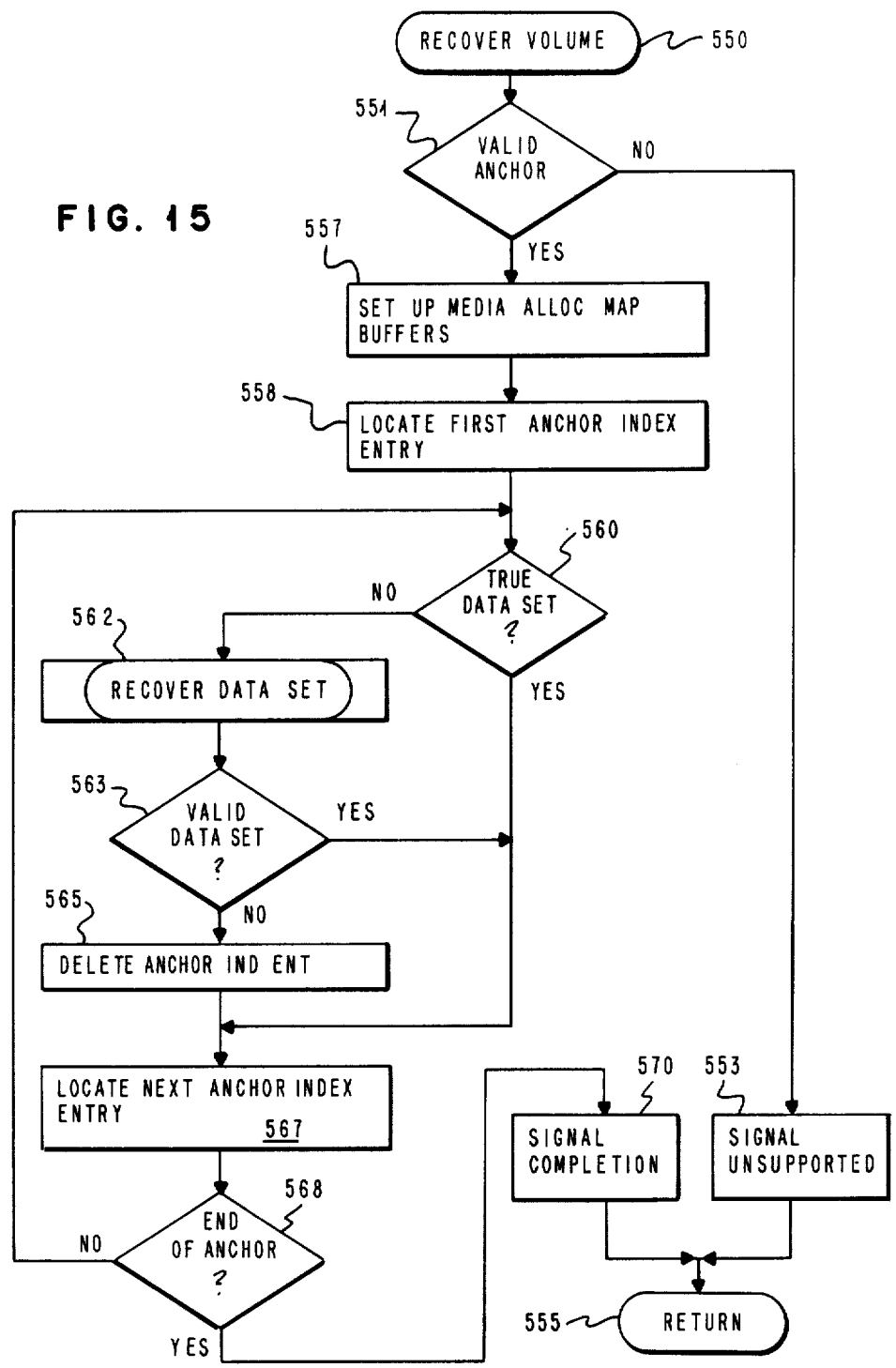
FIG. 15 is a flow diagram showing the operational steps of the present invention with respect to the Recover Volume procedure.

A logical operation of the present invention with respect to Recovery volume is illustrated in the flow diagram shown in FIG. 15. The procedure is started with the recovery volume service routine step 550. In step 551, the anchor is checked according to the syntax rules and supported values allowed in a root node. The anchor is already in the memory 26, in the volume data set index 304 of the UCS 300 (FIG. 8). If the anchor is found to be invalid, an indication of unsupported volume is returned via a return code in step 553 and the procedure is terminated in step 55 until the next recover volume request is received.

If the anchor is valid, the original volume media allocation map is copied in step 557 from the media allocation map buffer 312 in UCS 300 to the media allocation map buffer 1 (342) in global recovery buffer 340. Media allocation map buffer 2 (344) is intialized to show all logical sectors available except those allocated to the two copies of the media control record. The first anchor index entry is located in step 558.

If the anchor is valid, the original volume media allocation map is copied in step 557 from the media allocation map buffer 312 in UCS 300 to the media allocation map buffer 1 (342) in a global recovery buffer 340. Media allocation map buffer 2 (344) is initialized to show all logical sectors available except those allocated to the two copies of the media control record. The first anchor index entry is located in step 558.

If the current anchor index element references a true data set (not the anchor or the media allocation map) as tested in step 560, the recovery data set procedure is performed in step 562. The resulting return indication is tested in step 563 to see if the data set was a valid data set. If not, the index entry is deleted from the anchor in step 565.

When the index entry has been processed in steps 560–565, the next anchor index entry is located in step 567. If the check in step 568 shows that the end of the anchor has not been reached, steps 560–567 are performed again for the next index entry. When the last anchor index entry has been processed, recovery completion is signalled in step 570 before terminating the procedure as before in step 555.

When attempting to re-construct the media allocation map, there are three items to be considered: marking all logical sectors found during recovery as allocated (not available), preventing multiple index entries from referencing the same logical sector, and finding a new allocation if new index nodes are created during the recovery process.

In step 557 of FIG. 15, two media allocation maps are propared. The media allocation map in media allocation map (MAM) buffer 2 (344) of global recovery buffer 340 is initialized to all sectors available.

When a logical sector is referenced in any index entry encountered during recovery, the current sector status in the MAM buffer 2 (344) is first checked. If the sector is already allocated, the sector has been encountered before in the recovery procedures, so the record descriptor (leaf nodes) or index entry (intermediate node or root node) is deleted without further processing. This step guarantees that at the end of the recovery procedures, no logical sector is referenced in more than one index entry in the volume or data set indexes on the storage volume.

On the other hand, if the logical sector has not been located before (status in MAM buffer 2 (344) is available for allocation), the status is changed to allocated in both MAM buffer 1 (342) and MAM buffer 2 (344). When all data set and volume indexes have been processed at the end of the recovery procedures, all logical sectors referenced in index elements of the indexes are marked as allocated in the MAM buffer 2 (344).

During the processing of a data set, especially when the procedures encounter a read error for an intermediate node or when an abnormal external system power failure was experienced during the split of an index node (see FIG. 13), it may be necessary to allocate a new logical sector in order to complete the split process at higher levels of the index. The original media allocation map copied from UCS 300 into MAM buffer 1 (342) is used to find this new allocation.

During normal system operations, logical sectors are allocated by searching starting at the beginning of the media allocation map (lowest logical sector numbers) until the allocation can be satisfied (known as a first-fit algorithm). Because all allocations start at the beginning of the media allocation map, any actual available space on the storage volume tends to be concentrated among the logical sectors with the highest logical sector numbers. Therefore, to locate an available logical sector or set of contiguous logical sectors, the MAM buffer 1 is searched from the end of the map backwards (starting with the maximum LSN and searching toward the low LSN). Recovery will only generate new index nodes (single logical sectors), so fragmentation of the storage volume is not a problem. If an available sector is found during this search, the probability that the sector is actually allocated to an index entry not yet processed by recovery is low. Only in the case of a storage volume where there is actually no room left will this cause a problem. The later index entry which refers to the sector just allocated will be deleted when encountered as described above.

Figure 16A:
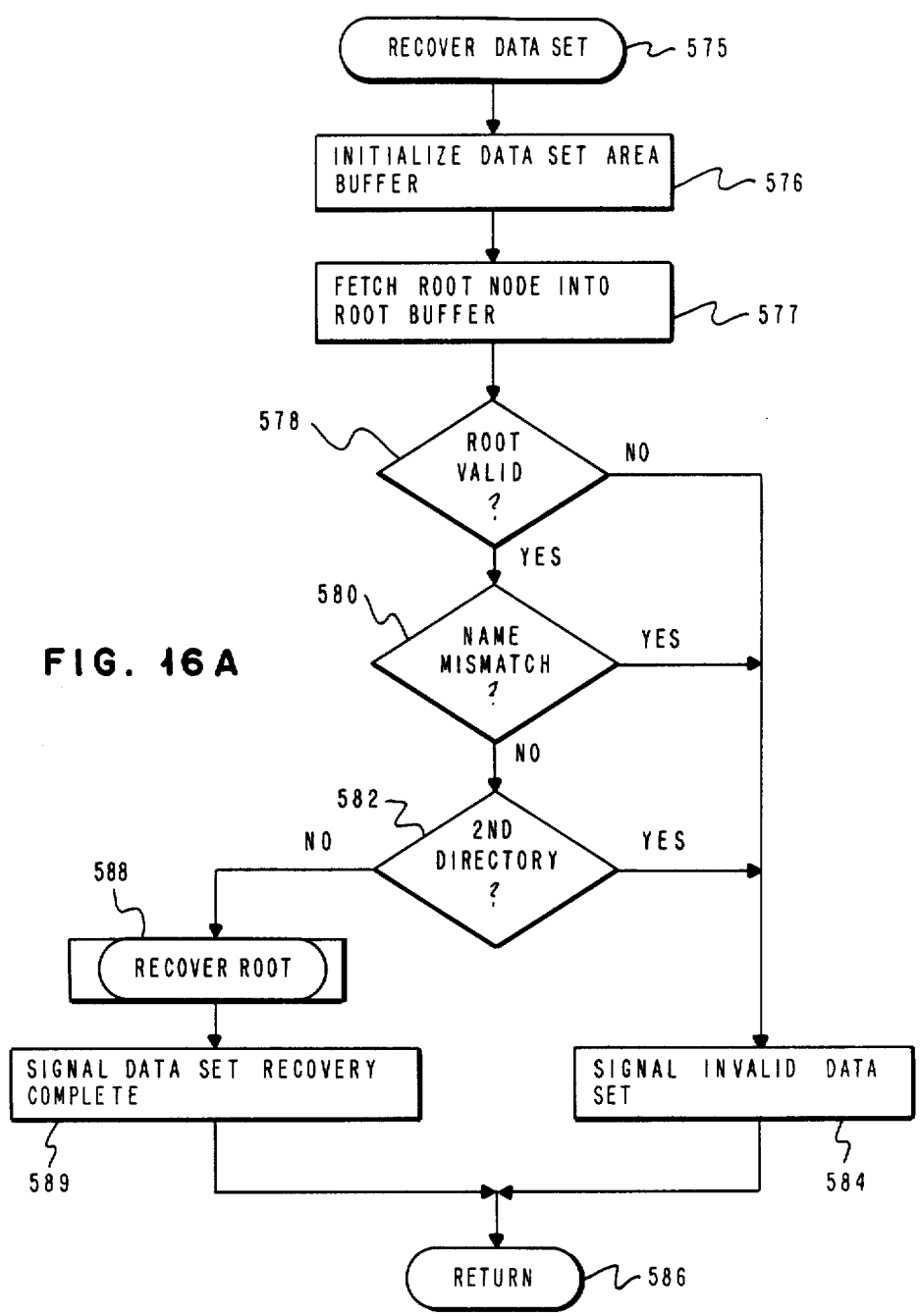
FIG. 16A is a flow diagram showing the operational steps of the present invention with respect to the Recover Data Set procedure.

A logical operation of the present invention with respect to Recover data set is illustrated in the flow diagram shown in FIG. 16A. The procedure is started with the recover data set service routine step 575. In step 576 the data set area buffer for the recovery of this data set is initialized properly.

Next, root node checks are performed. In step 578, the root is checked for syntax and supported values in the profile. If a data set name was provided by the procedure requesting the data set recovery (recover single leaf procedure only), that name is compared in step 580 with the data set name in the root node data set profile. Finally, in step 582, the current root and current environment are checked to see if the current root may be an invalid second-level directory (directory referenced from a directory leaf node). If there is any problem with the result of the checking in steps 578, 580, or 582, an indication of invalid data set is returned via a return code in step 584 and the procedure is terminated in step 586 until the next recover data set request is received.

If all checks of the root node syntax and environment are favorable, the recover root procedure is performed in step 588. Data set recovery complete is then signalled via return code in step 589 and the procedure is terminated in step 586 as above.

Figure 16B:
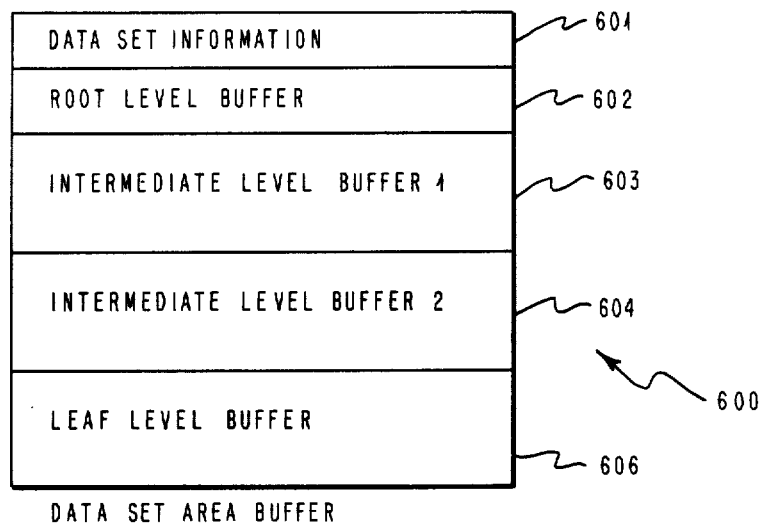
FIGS. 16B-C are block diagrams showing more details of the data set recovery area buffer introduced in FIG. 9, with further details provided on the contents of the root level buffer in the data set area buffer.

FIG. 16B is a block diagram which provides more detail regarding the contents of the data set area 1 (346) and data set area 2 (348) buffers shown in the global recovery buffer 340 block diagram in FIG. 9. A data set area buffer 600 contains five different fields.

A data set information area 601 contains current data set recovery status indicators to control the sequencing of the recovery of the data set as a whole. This area 601 also contains a prototype index node header for checking the validity of index nodes at lower levels within the same data set, and often-used parameters from the data and index attributes component of the data set profile.

A root level buffer 602 provides a working storage for the recovery of the root of the data set. Two buffers are allocated for recovery of intermediate levels of the data set, intermediate level buffer 1 (603) and buffer 2 (604).

A leaf level buffer 606 provides working storage for the recovery of the leaf level. For a root/leaf data set index, only the root level buffer 602 is actually used in the data set recovery procedures; the remaining level buffers are not used. For a 2-level data set only the root level buffer 602 and leaf level buffer 606 are used. For more levels in the data set one or both of the intermediate level buffers 1 (603) and 2 (604) are required.

Figure 16C:
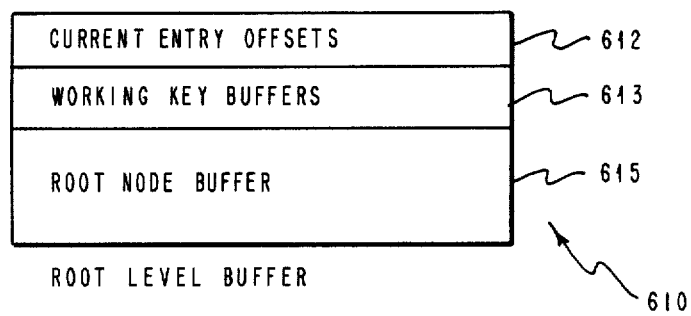

FIG. 16C is a block diagram which provides more detail regarding the contents of the root level buffer 602 in the data set area buffer 600 in FIG. 16B. A root level buffer 610 contains three different parts: a current entry offsets area 612 which contains offsets within the index node to the current index entry and various parameters within the entry; a working key buffers area 613 in which the procedure can store up to two keys temporarily for later use or for creation of an index entry as needed; and, a root node buffer 615 which contains a copy of the root node for the data set being recovered.

Figure 16D:
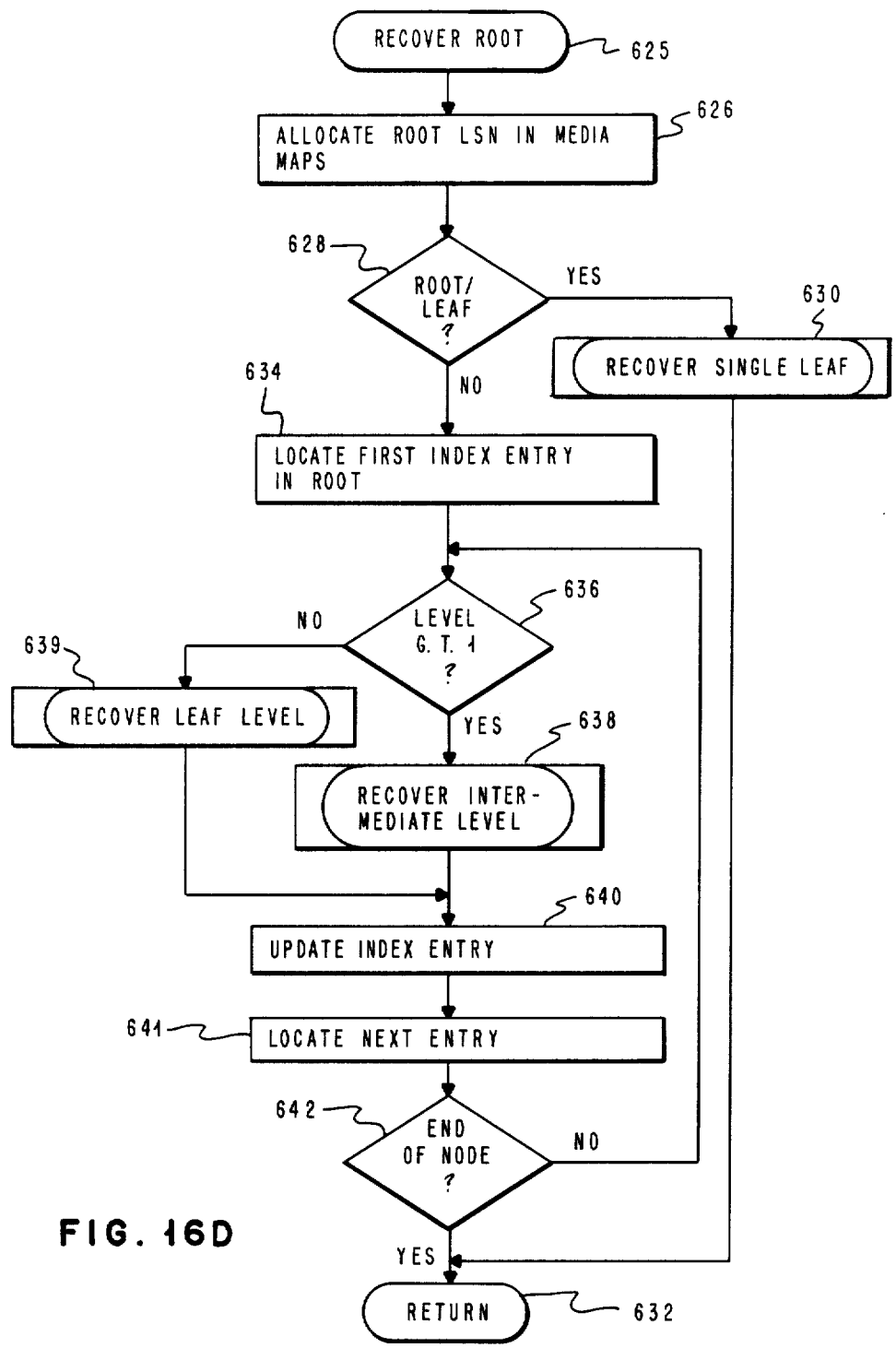
FIG. 16D is a flow diagram showing the operational steps of the present invention with respect to the Recover Root procedure.

A logical operation of the present invention with respect to Recover root is illustrated in the flow diagram shown in FIG. 16D. The procedure is started with the recover root service routine step 625. In step 626, the media MAP status indicators for the root node and the shadow copy are updated, since the data set root is verified as having valid syntax and existing within a valid environment. If the check in step 628 finds that the root is a root/leaf, the index component portion is recovered by performing the recover single leaf procedure in step 630. Since this procedure processes the recovery of the entire root/leaf node, there is nothing further required, and the procedure is terminated until the next request for recovery root is received.

If there are lower levels in the index, the first index entry in the root node is located in step 634. To determine which of the lower-level recovery procedures should be performed, the root node level is checked in step 636. If greater than 1, the recover intermediate level procedure is performed with intermediate level buffer 1 (603) being the designated level buffer for recovery of the highest intermediate level; otherwise, the recover leaf level procedure is performed. On return from the selected recover procedure, the index entry in the root node is updated as indicated in step 640.

Having processed the current root node index entry, the next index entry is located in step 641. If the check in step 642 shows that the end of the node has not been reached, steps 636-641 are processed again for the next index entry. On reaching the end of the root node, the procedure is terminated in step 632 as above.

Figure 17A:
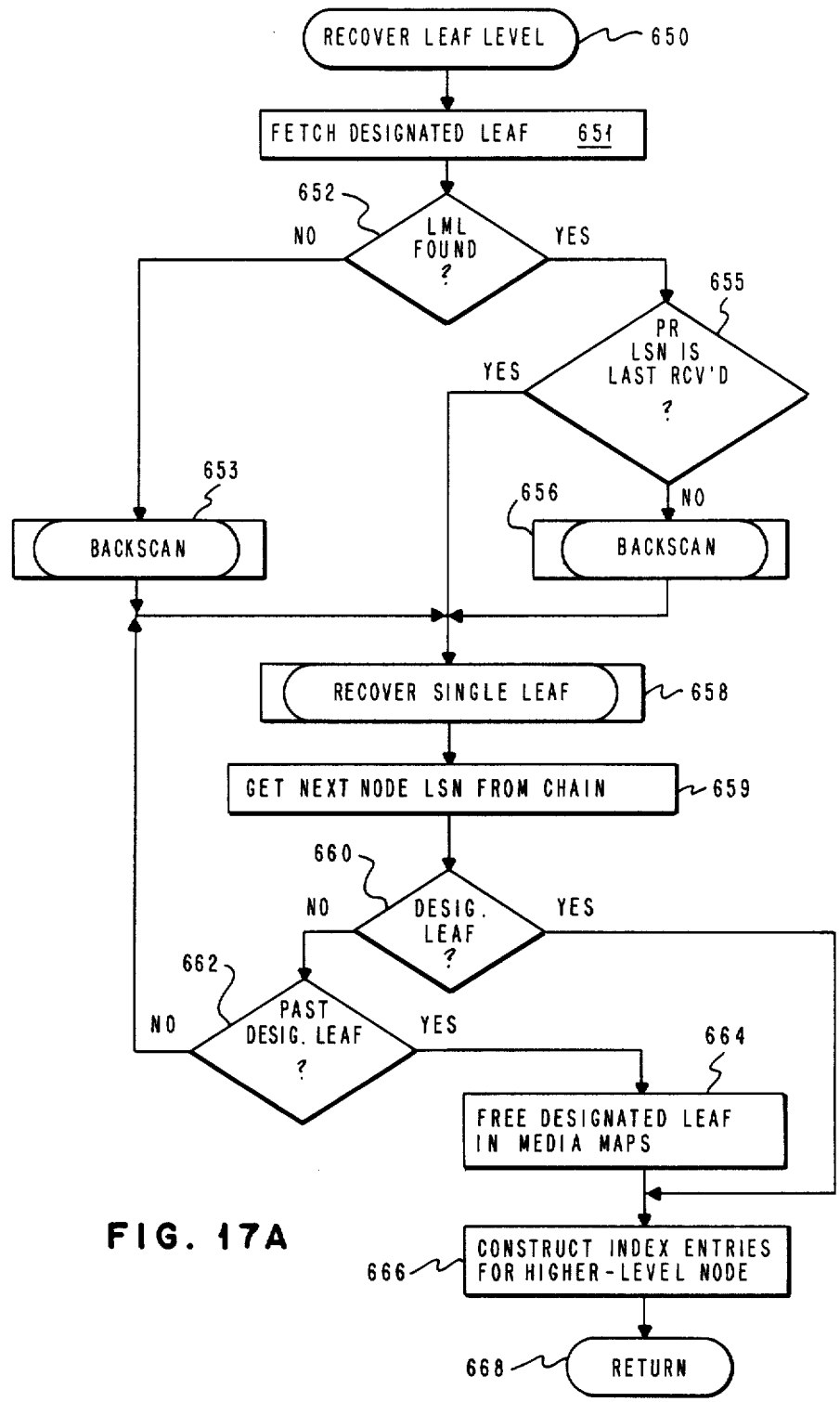
FIGS. 17A-B are flow diagrams showing the operational steps of the present invention with respect to the Recover Leaf Level and Backscan procedures.

A logical operation of the present invention with respect to Recover leaf level is illustrated in the flow diagram shown in FIG. 17A. The procedure is started with the recover leaf level service routine step 650. In step 651, the designated leaf node, for which the service request was issued by the recovery procedure for a higher-level node, is fetched.

Next, the occurrence of an index error such as is illustrated in the example shown in FIG. 13 is checked. If in step 652 it is found that the left-most leaf (prior leaf LSN is invalid LSN) has not been located, the backward procedure is performed in step 653 to find the left-most leaf. This case can occur if (referring to FIG. 6) the first intermediate node I (244) could not be fetched successfully and the leaf node F (266) was the first leaf node located in the data set. The backward scan uses the prior leaf LSN 216 of the leaf node chain 206 (FIG. 5A) to locate leaf nodes containing index entries whose key values are lower than those in the current leaf node. If the left-most leaf has already been located and recovered, a check is made in step 655 to verify that the last successfully-recovered leaf is the leaf node immediately prior to the designated leaf node (LSN of last recovered = prior leaf LSN of designated LSN, and next leaf LSN of last recovered = LSN of designated leaf). If the test in step 655 indicates that there is a problem at the leaf level, a backward scan is made to the last-recovered leaf. If all the chain values are consistent and no index error is indicated, the designated leaf node is retained as the net leaf node to be recovered.

In step 658, the current leaf is recovered by performing the recover single leaf procedure. The next leaf LSN is fetched from the leaf chain of the leaf just recovered in step 659. If the tests in steps 660 and 662 show that the original designated leaf has not yet been reached, the next leaf node is fetched and recovered similarly in repetition of steps 658 and 659. If the test in 660 shows that the designated leaf node has been recovered, no further recovery action is required for this service request. If the test in step 662 of leaf node high keys shows that at or past the designated leaf node in the index have already been recovered (which would be the case for recovering leaf nodes C1 (514) and C2 (516) with designated leaf node C (506) in FIG. 13), the designated node is discarded by de-allocating the logical sector in the media allocation maps.

Finally, other replacement index entries are constructed for insertion or replacement in the higher-level index node, and the procedure is terminated in step 668 until the next request for recover root is received.

Figure 17B:
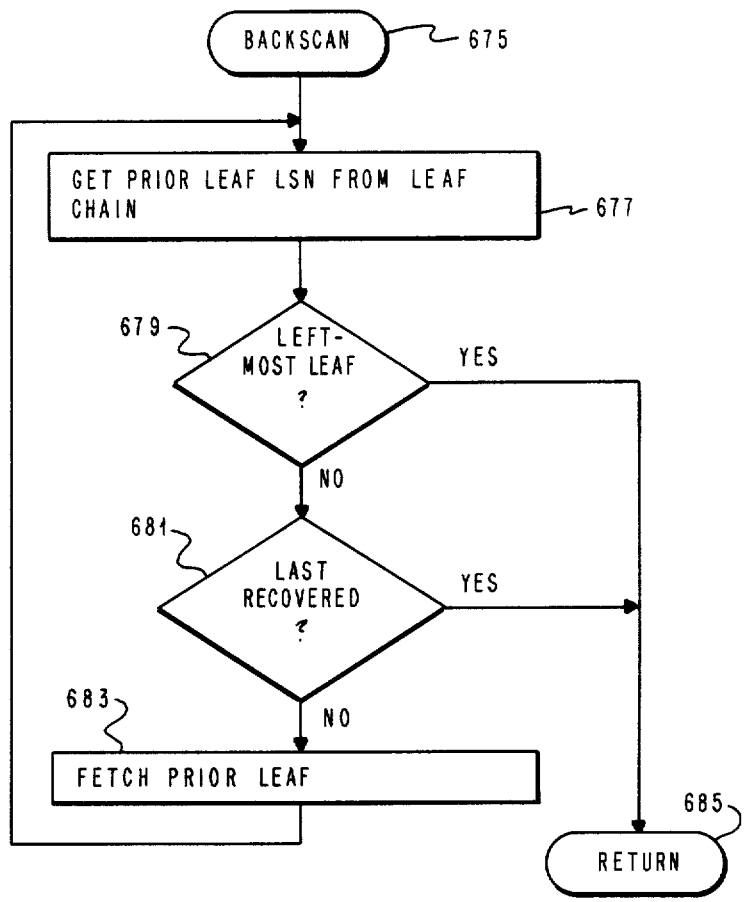

A logical operation of the present invention with respect to Backscan is illustrated in the flow diagram shown in FIG. 17B. The procedure is started with the backscan service routine step 675. In step 677, the prior leaf LSN is obtained from the leaf chain of the current leaf node. If the prior leaf LSN is invalid in step 679 or if the prior leaf LSN is the last recovered leaf LSN in step 681, the procedure is terminated in step 685 until the next request for recover root is received.

If the left-most leaf or the last recovered leaf has not been reached, the prior leaf is fetched in step 683 and steps 677–681 are repeated for the newly-fetched prior leaf node.

Figure 17C:
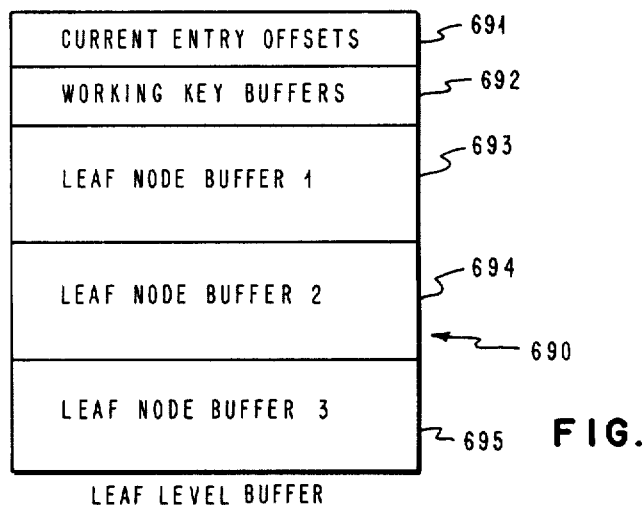
FIG. 17C is a block diagram showing more details of the leaf level recovery area buffer introduced in FIG. 16B.

FIG. 17C is a block diagram which provides more detail regarding the contents of the leaf level buffer 606 in the data set area buffer 600 in FIG. 16B. A leaf level buffer 690 contains three different sections: a current entry offsets area 691 which contains offsets within the index node to the current index entry and various parameters within the entry; a working key buffers area 692 in which the procedure can store up to two keys temporarily for later use or for creation of an index entry as needed; and, three leaf node buffers, buffer 1 (693), buffer 2 (694), and buffer 3 (695). Except for the number of node buffers, the leaf level recovery buffer in FIG. 17C has the same format as that of the root level buffer in FIG. 16C.

Since there is always only one root in a data set, only one root node buffer is needed. However, as indicated in the discussion for FIGS. 17A–17C, there may be three different index nodes of interest during a backscan operation: the original designated leaf node; the left-most leaf or last recovered leaf; and, the leaf node read as part of the scan between the first two. At the leaf level, index entries are never added, they are at most deleted due to the problem of duplicate allocations of the same logical sector. Therefore, a split will not occur at the leaf level during the recovery procedures.

In summary, the present invention enables the protection of data sets stored on the DASD from severe data loss for the system operator due to a storage media read error on a single media sector. It also enables the detection of possible errors and the prevention of access for normal operations to a data set the index of which may not be correct and consistent. Furthermore, it enables the scanning of all index nodes on the volume to resolve all index errors which may arise due to storage media errors or due to incomplete data set index updates when the external system power fails during complex changes to the data set index. These data protection and recovery methods require very little performance degradation during data set access for normal operation of the word processing system 10.

Although several embodiments of the invention have been illustrated in the drawing and described in the foregoing detailed description, it will be understood that the invention is not limited to the embodiments disclosed but is capable of numerous arrangements and substitutions without departing from the spirit and scope of the invention.

What is claimed is:

1. In an information processing system in which information on direct access storage device volumes is arranged in accordance with a plurality of hierarchical index nodes a volume storage and recovery system for reducing the risk of serious loss of data or inability to access data on a storage volume due to a storage media error on one media sector comprising:
   placing a volume shadow offset value constant for the volume in the highest level index node, said offset value being an integer, fixed for all transactions on the volume;
   recording two copies of each of a plurality of selected critical index containing media sectors on the storage volume, the first, primary of said copies located in a logical sector location indicated by one of said plurality of index nodes and the second, shadow of said copies located fixed in another logical sector a fixed distance, equal to the offset value in the highest level index node from said first, primary copy; and
   recovering data on said storage volume by scanning each of said plurality of index nodes, thereby accessing said first, primary and said second, shadow copies of each of said plurality of selected critical index containing media sectors on the storage volume.

2. A volume storage and recovery system according to claim 1 wherein each of said plurality of selected critical index containing media sectors includes a media control record at fixed locations on said storage volume, said media control record containing information to identify the location of a volume anchor, said volume anchor including information to identify the location of all data sets and data set directories, access to all data sets and data set directories being enabled by a root node provided for each data set and data directory on said storage volume.

3. A volume storage and recovery system according to claim 2 wherein said recording step comprises the step of: designating a leaf shadow indicator in a data set profile of the root node for each data set.

4. A volume storage and recovery system according to claim 3 wherein said plurality of indexes includes at least one index node stored in a logical sector, further comprising the steps of reading an index node, and writing an index node.

5. A volume storage and recovery system according to claim 4 wherein an index node includes a primary copy having a logical sector number and is identifiable by type, wherein a leaf node is a type of index node, the step of reading an index node comprising the steps of:
- reading the primary copy of an index node using a logical sector number;
- examining the type of index node expected;
- calculating a first shadow copy by adding said volume shadow offset to the logical sector number of the primary copy if a root node was expected;
- determining if an expected leaf node is shadowed; and
- calculating a first shadow copy by adding said volume shadow offset to the logical sector number of the primary copy subsequent to the determination that the expected leaf node is shadowed.

6. A volume storage and recovery system according to claim 4 wherein the step of writing an index node comprises the steps of:
- writing the primary copy of an index node using a logical sector number;
- examining the type of index node expected;
- calculating a first shadow copy by adding said volume shadow offset to the logical sector number of the primary copy if a root node was expected;
- determining if an expected leaf node is shadowed;
- calculating a second shadow copy by adding said volume offset to the logical sector number of the primary copy subsequent to the determination that the expected leaf node is shadowed; and
- writing said first shadow copy and said second shadow copy on said storage volume.

7. A volume storage and recovery system according to claim 2 wherein said storage volume includes a volume media allocation map and a first and a second media allocation map buffer and is divided into logical sectors and wherein said volume anchor includes an anchor index entry for identifying data on said storage volume, the step of recovering data on said storage volume comprising the steps of:
- checking said volume anchor for syntax validity and allowable values of root nodes;
- copying a volume media allocation map from a first media allocation map buffer to a second media allocation map buffer;
- initializing said second media allocation map buffer to show all logical sectors available except those allocated to said to copies;
- locating a first anchor index entry and determining that such entry references a true data set;
- recovering a data set;
- deleting such entry subsequent to the determination that such data set was not valid;
- locating the next anchor index entry and repeating the steps of recovery and deleting; and
- determining the end of said volume anchor.

8. A volume storage and recovery system according to claim 7 wherein said storage volume further includes a root node buffer and wherein each data set is identified by a data set name and said data set directories include a second level directory, the step of recovering a data set comprising the steps of:
- initializing a data set area buffer;
- fetching the root node into a root node buffer;
- checking said root node for syntax validity and supported values;
- comparing a data set name provided at the start of said recovery data set procedure to a data set name associated with said fetched root node;
- determining that the root of such fetched root node is not an invalid second level directory;
- recovering a root; and
- signalling a completed data set recover, thereby terminating said recover data set.

9. A volume storage and recovery system according to claim 8 wherein said volume media allocation map includes media map status indicators for each sector on said storage volume and wherein a root includes at least one leaf, the step of executing a recover root comprising the steps of:
- updating media map status indicators for said root node and said shadow copy;
- determining if said root is a leaf; and
- recovering a single leaf subsequent to the determination that said root is a leaf.

10. A volume storage and recovery system according to claim 8 wherein said volume media allocation map includes media map status indicators for each sector on said storage volume and wherein a root includes at least one leaf, and wherein said root node includes at least one index entry, and wherein said data sets comprise a plurality of levels, the step of recovering a root comprising the steps of:
- updating media map status indicators for said root node and said shadow copy;
- determining if said root is a leaf;
- locating the first index entry in said root node subsequent to the determination that said root is not a leaf;
- checking a value level of said root node;
- recovering a leaf level subsequent to the determination that the value level of said root node is equal to one;
- updating the index entry in said root node;
- locating the next entry of said root node and repeating the steps of determining the level of said root node, performing the recover leaf level procedure, and updating the index entry; and
- terminating said recovery root procedure subsequent to determining that the last index entry of said root node has been reached.

11. A volume storage and recovery system according to claim 10 further comprising the step of recovering a level prior to the step of updating said index entry subsequent to the determination that the value of said root node level is greater than one.

12. A volume storage and recovery system according to claim 11 wherein a leaf node includes at least one leaf, the step of recovering a leaf level comprising the steps of:
- fetching a designated leaf node;
- locating the left-most leaf;
- executing a backscan to find said left-most leaf if said left-most leaf cannot be located;
- recovering a current leaf;
- fetching the next leaf logical sector number from a leaf chain on which said current leaf is located;
- discarding a designated node by de-allocating a logical sector corresponding to said designated node in said media allocation map; and
- constructing a plurality of replacement index entries for insertion into a higher level index node.

13. A volume storage and recovery system according to claim 12 wherein said backscan step comprises the steps of:
- obtaining a prior leaf logical sector number from said leaf chain of the current leaf node;
- determining that said prior leaf logical sector number is valid;
- determining that the prior leaf logical sector number is the last recovered leaf logical sector number; and
- terminating said backscan subsequent to the determination that the last recovered leaf has been reached.

* * * * *

UNITED STATES PATENT AND TRADEMARK OFFICE
CERTIFICATE OF CORRECTION

PATENT NO. : 4,750,106
DATED : June 7, 1988
INVENTOR(S) : J. A. Aiken, Jr.

It is certified that error appears in the above-identified patent and that said Letters Patent is hereby corrected as shown below:

Col. 30, line 29, insert --index-- before "entry".

Signed and Sealed this

Eleventh Day of February, 1992

Attest:

HARRY F. MANBECK, JR.

*Attesting Officer*   *Commissioner of Patents and Trademarks*